US012793244B2

(12) United States Patent
Choi et al.

(10) Patent No.: US 12,793,244 B2
(45) Date of Patent: Nov. 10, 2026

(54) ELECTRONIC DEVICE FOR ACQUIRING DEPTH MAP FROM CODED IMAGE, AND OPERATING METHOD THEREFOR

(71) Applicant: SAMSUNG ELECTRONICS CO., LTD., Suwon-si (KR)

(72) Inventors: Jongchul Choi, Suwon-si (KR); Seungjae Lee, Suwon-si (KR); Bonkon Koo, Suwon-si (KR); Youngmo Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 222 days.

(21) Appl. No.: 18/885,122

(22) Filed: Sep. 13, 2024

(65) Prior Publication Data

US 2025/0005776 A1 Jan. 2, 2025

Related U.S. Application Data

(63) Continuation of application No. PCT/KR2023/000649, filed on Jan. 13, 2023.

(30) Foreign Application Priority Data

Mar. 14, 2022 (KR) ........................ 10-2022-0031647

(51) Int. Cl.
*G06T 7/50* (2017.01)
*G06F 3/01* (2006.01)
(Continued)

(52) U.S. Cl.
CPC ................ *G06T 7/50* (2017.01); *G06F 3/013* (2013.01); *G06V 10/25* (2022.01); *G09G 3/3433* (2013.01);
(Continued)

(58) Field of Classification Search
CPC ............. G06T 7/50; G06T 2207/20081; G06T 2207/20084; G06T 5/20; G06T 7/11;
(Continued)

(56) References Cited

U.S. PATENT DOCUMENTS 7,888,626 B2 2/2011 Slinger et al.
8,582,820 B2 11/2013 Kane et al.
(Continued)

FOREIGN PATENT DOCUMENTS

KR 10-2010-0090961 A 8/2010
KR 10-1186926 B1 9/2012
(Continued)

OTHER PUBLICATIONS

Wu, Yicheng, et al. "Phasecam3d—learning phase masks for passive single view depth estimation." 2019 IEEE International Conference on Computational Photography (ICCP). IEEE, 2019.*
(Continued)

*Primary Examiner* — Shefali D Goradia
(74) *Attorney, Agent, or Firm* — Sughrue Mion, PLLC

(57) ABSTRACT

An electronic device for obtaining a depth map from a coded image obtained using an active phase mask and a method for operating the same are provided. The electronic device according to an embodiment of the present disclosure may generate a first phase mask having a first coded aperture pattern in a first area on the active mask panel based on controlling the electrical driving signal applied to the active mask panel, obtain a coded image based on light transmitted through the first phase mask, wherein the coded image is phase-modulated, and wherein the light transmitted through the first phase mask is received via the image sensor, and obtain a depth map corresponding to the coded image by using an artificial intelligence model trained to extract a depth map from a convolution image.

20 Claims, 15 Drawing Sheets

(51) Int. Cl.

| | |
|---|---|
| ***G06N 3/08*** | (2023.01) |
| ***G06V 10/25*** | (2022.01) |
| ***G09G 3/34*** | (2006.01) |
| ***G09G 3/36*** | (2006.01) |

(52) U.S. Cl.
CPC .. *G09G 3/3648* (2013.01); *G06T 2207/20081* (2013.01)

(58) Field of Classification Search
CPC ...... G06F 3/013; G06V 10/25; G06V 10/147; G06V 10/764; G06V 10/82; G09G 3/3433; G09G 3/3648; G01S 17/89; G06N 3/045; G06N 3/0464; G06N 3/08; G06N 3/084; G02F 1/1337; G02F 1/137; H04N 13/383
See application file for complete search history.

(56) References Cited

U.S. PATENT DOCUMENTS

| | | | | |
|---|---|---|---|---|
| 8,894,216 | B2 * | 11/2014 | Reichow | G02B 30/24 359/569 |
| 9,275,078 | B2 | 3/2016 | Bhardwaj et al. | |
| 9,872,012 | B2 | 1/2018 | Paramonov et al. | |
| 10,521,695 | B2 | 12/2019 | Agashe et al. | |
| 10,996,104 | B2 | 5/2021 | Graham | |
| 11,354,535 | B2 * | 6/2022 | Choi | G06V 10/26 |
| 2010/0201865 | A1 | 8/2010 | Han et al. | |
| 2015/0381965 | A1 * | 12/2015 | Atanassov | G06T 3/4061 348/47 |
| 2017/0061603 | A1 | 3/2017 | Agashe et al. | |
| 2018/0149753 | A1 | 5/2018 | Shin et al. | |
| 2020/0326536 | A1 | 10/2020 | Koo et al. | |
| 2020/0349729 | A1 | 11/2020 | Wu et al. | |
| 2021/0073953 | A1 | 3/2021 | Lee | |
| 2021/0278630 | A1 | 9/2021 | Lee et al. | |
| 2021/0314546 | A1 | 10/2021 | Choi et al. | |
| 2022/0383530 | A1 * | 12/2022 | Giryes | G06N 3/0464 |

FOREIGN PATENT DOCUMENTS

| | | | |
|---|---|---|---|
| KR | 10-2016-0004912 | A | 1/2016 |
| KR | 10-1637871 | B1 | 7/2016 |
| KR | 10-2016-0115682 | A | 10/2016 |
| KR | 10-2135560 | B1 | 7/2020 |
| KR | 10-2021-0071410 | A | 6/2021 |
| KR | 10-2021-0124041 | A | 10/2021 |

OTHER PUBLICATIONS

Sakib Rahman, Md Sadman, and Aydogan Ozcan. “Integration of programmable diffraction with digital neural networks.” ACS Photonics 11.8 (2024): 2906-2922.*

Extended European Search Report dated May 23, 2025, issued by the European Patent Office in European Application No. 23770944.9.

Kujawinska et al., “LCoS spatial light modulators as active phase elements of full-field measurement systems and sensors”, Metrology and Measurement Systems, 2012, DOI: 10.2478/v10178-012-0038-3, pp. 445-458 (15 pages total).

Haruka Saito et al., “Image focusing analysis using coded aperture made of a printed mask”, Japanese Journal of Applied Physics, vol. 58, pp. SKKA01-1~5, Jul. 18, 2019, DOI: 10.7567/1347-4065/ab28ff.

International Search Report (PCT/ISA/210) issued on Apr. 13, 2023 by the International Searching Authority in International Patent Application No. PCT/KR2023/000649.

Written Opinion (PCT/ISA/237) issued on Apr. 13, 2023 by the International Searching Authority in International Patent Application No. PCT/KR2023/000649.

Nathan Silberman et al., “NYU Depth Dataset V2”, Oct. 2012, 3 pages, url: https://cs.nyu.edu/~fergus/datasets/nyu_depth_v2.html.

Julie Chang et al., “Deep Optics for Monocular Depth Estimation and 3D Object Detection”, ICCV, Oct. 2019, pp. 10193-10202.

Yicheng Wu et al., “PhaseCam3D—Learning Phase Masks for Passive Single View Depth Estimation”, ICCP, May 2019, 12 pages.

Nathan Silberman et al., “Indoor Segmentation and Support Inference from RGBD Images”, ECCV, Oct. 2012, 14 pages.

Alexander W. Bergman et al., “Deep Adaptive LiDAR: End-to-end Optimization of Sampling and Depth Completion at Low Sampling Rates”, ICCP, Apr. 2020, 11 pages.

Gun-Yeal Lee et al., “Metasurface eyepiece for augmented reality”, Nature Communications, vol. 9, Article No. 4562, Nov. 2018, 11 pages, DOI: 10.1038/s41467-018-07011-5.

Xing-Xu Zhang et al., “Passive ranging and a three-dimensional imaging system through wavefront coding”, Chinese Physics B, vol. 27, No. 5, Article No. 054205, May 2018, 8 pages, DOI: 10.1088/1674-1056/27/5/054205.

Communication issued on Sep. 3, 2026 by the Korean Ministry of Intellectual Property (MOIP) in Korean Patent Application No. 10-2022-0031647.

* cited by examiner

ELECTRONIC DEVICE FOR ACQUIRING DEPTH MAP FROM CODED IMAGE, AND OPERATING METHOD THEREFOR

CROSS-REFERENCES TO RELATED APPLICATIONS

This application is a continuation of International Application No. PCT/KR2023/000649, filed on Jan. 13, 2024, at the Korean Intellectual Property Office, which claims priority to Korean Patent Application No. 10-2022-0031647, filed on Mar. 14, 2022, at the Korean Intellectual Property Office, the disclosures of which are incorporated herein in their entireties.

FIELD

The present disclosure relates to an electronic device for obtaining a depth map from a coded image and a method for operating the same. In particular, the present disclosure relates to an electronic device and a method operated by the electronic device for obtaining a coded image by using a phase mask having a coded aperture pattern and obtaining a depth map from the obtained coded image by using an artificial intelligence model.

BACKGROUND

A deconvolution method is used in related art as a technique for restoring an in-focus clear image from an out-of-focus blurry image. The deconvolution method is a technique for obtaining an out-of-focus distorted image by using a phase mask with a coded aperture that causes chromatic aberration and astigmatism, then obtaining a normal in-focus image from the obtained image according to a point spread function (PSF) indicating the correlation between distortion and depth. A phase mask used in known deconvolution methods is located in a part of a diaphragm of a camera for uniform phase control across fields, and is implemented in the form of a film produced by etching an aperture through a method such as photolithography or the like.

A phase mask in related art is located in a part of a diaphragm of a camera and therefore provides the same focus distortion effect for all light entering the diaphragm, resulting in low pixel resolution of a depth value and low accuracy of the depth value. Additionally, because phase mask in related art is formed by etching an aperture pattern on a film, it is implemented as a passive mask in which the aperture pattern is physically fixed. Therefore, phase mask in related art cannot accurately measure depth values according to the characteristics of a shooting environment, such as different depth ranges.

SUMMARY

According to an aspect of the present disclosure, an electronic device for obtaining a depth map from a coded image is provided. According to an embodiment of the present disclosure, the electronic device may include a lens assembly including at least one lens, an active mask panel configured to change refractive power of light transmitted through the active mask panel based on an electrical driving signal, an image sensor configured to receive light transmitted through the lens assembly and the active mask panel, and at least one processor. The at least one processor may be configured to generate a first phase mask having a first coded aperture pattern in a first area on the active mask panel based on controlling the electrical driving signal applied to the active mask panel. The at least one processor may be configured to obtain a coded image based on light transmitted through the first phase mask, wherein the coded image is phase-modulated, and wherein the light transmitted through the first phase mask is received via the image sensor. The at least one processor may be configured to obtain a depth map corresponding to the coded image by using an artificial intelligence model trained to extract a depth map from a convolution image.

According to another aspect of the present disclosure, a method for obtaining depth map from a coded image is provided. The method may be performed by at least one processor of an electronic device. The method may include generating a first phase mask having a first coded aperture pattern in a first area based on an electrical driving signal applied to an active mask panel; obtaining a coded image based on light transmitted through the first phase mask, wherein the coded image is phase-modulated; and obtaining a depth map corresponding to the coded image by using an artificial intelligence model trained to extract a depth map from a convolution image.

According to another aspect of the present disclosure, there is provided a non-transitory computer readable medium including one or more instructions that, when executed, cause at least one processor to generate a first phase mask having a first coded aperture pattern in a first area based on an electrical driving signal applied to an active mask panel; obtain a coded image light transmitted through the first phase mask, wherein the coded image is phase-modulated; and obtain a depth map corresponding to the coded image by using an artificial intelligence model trained to extract a depth map from a convolution image.

BRIEF DESCRIPTION OF THE DRAWINGS

The present disclosure will be easily understood from the following description taken in conjunction with the accompanying drawings in which reference numerals denote structural elements.

DETAILED DESCRIPTION

The terms used in embodiments of the present specification are general terms that are currently widely used and are selected by taking into account the functions in the present disclosure, but these terms may vary according to the intention of one of ordinary skill in the art, precedent cases, advent of new technologies, etc. Furthermore, specific terms may be arbitrarily selected by the applicant, and in this case, the meaning of the selected terms will be described in detail in the detailed description of a corresponding embodiment. Thus, the terms used herein should be defined not by simple appellations thereof but based on the meaning of the terms together with the overall description of the present disclosure.

Singular expressions used herein are intended to include plural expressions as well unless the context clearly indicates otherwise. All the terms used herein, which include technical or scientific terms, may have the same meaning that is generally understood by a person of ordinary skill in the art described in the present specification.

Throughout the present disclosure, when a part "includes" or "comprises" an element, unless there is a particular description contrary thereto, it is understood that the part may further include other elements, not excluding the other elements. Furthermore, terms, such as "portion," "module," etc., used herein indicate a unit for processing at least one function or operation, and may be implemented as hardware or software or a combination of hardware and software.

The expression "configured to (or set to)" used herein may be used interchangeably, according to context, with, for example, the expression "suitable for," "having the capacity to," "designed to," "adapted to," "made to," or "capable of". The term "configured to (or set to)" may not necessarily mean only "specifically designed to" in terms of hardware. Instead, the expression "a system configured to" may mean, in some contexts, the system being "capable of", together with other devices or components. For example, the expression "a processor configured to (or set to) perform A, B, and C" may mean a dedicated processor (e.g., an embedded processor) for performing the corresponding operations, or a general-purpose processor (e.g., a central processing unit (CPU) or an application processor (AP)) capable of performing the corresponding operations by executing one or more software programs stored in a memory.

Furthermore, in the present disclosure, it should be understood that when a component is referred to as being "connected" or "coupled" to another component, the component may be directly connected or coupled to the other component, but may also be connected or coupled to the other component via another intervening component therebetween unless there is a particular description contrary thereto.

Figure 1:
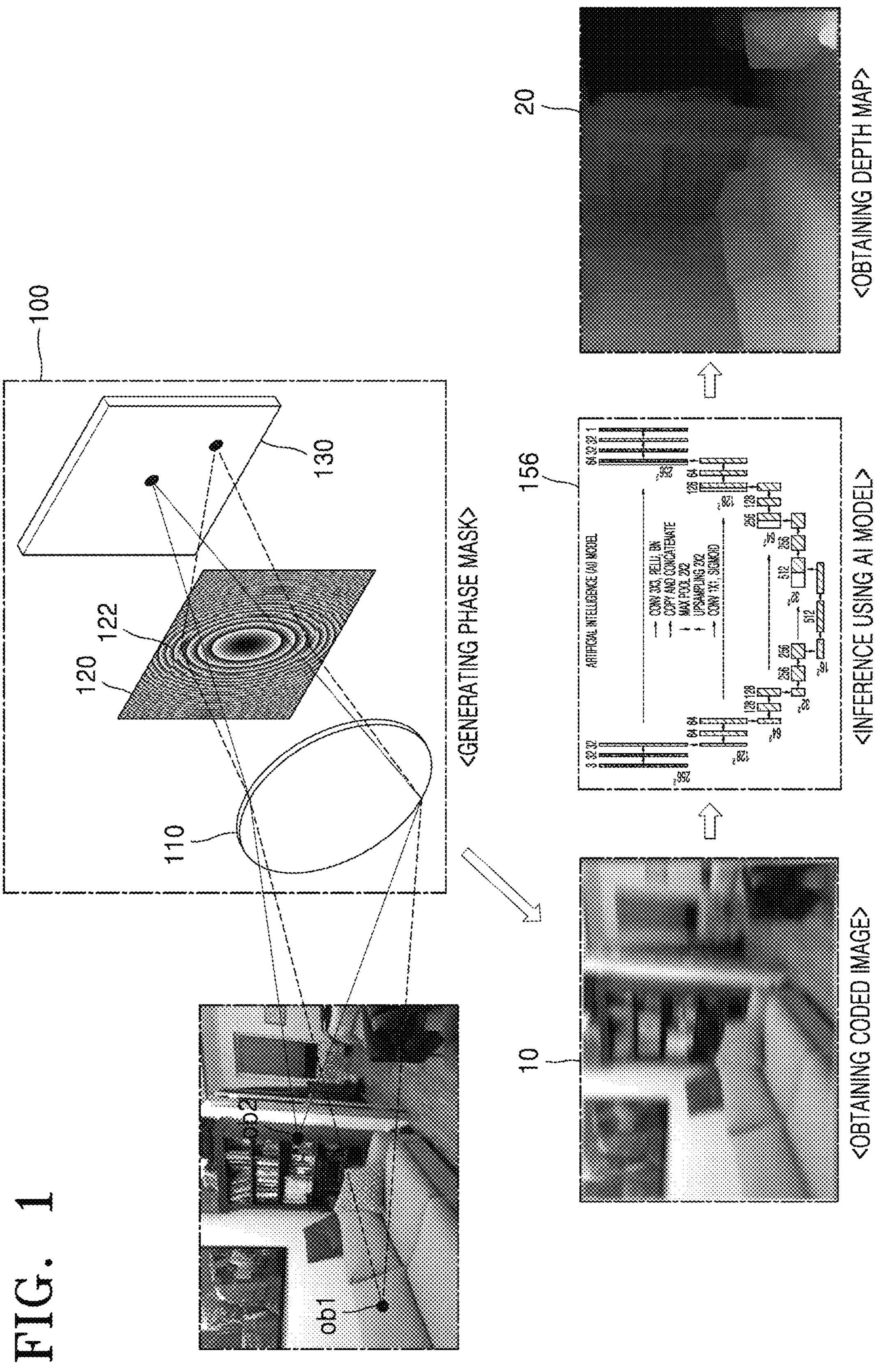
FIG. 1 is a diagram illustrating an exemplary operation in which an electronic device obtains a coded image by using a phase mask and obtains a depth map from using the coded image.
Figure 13:
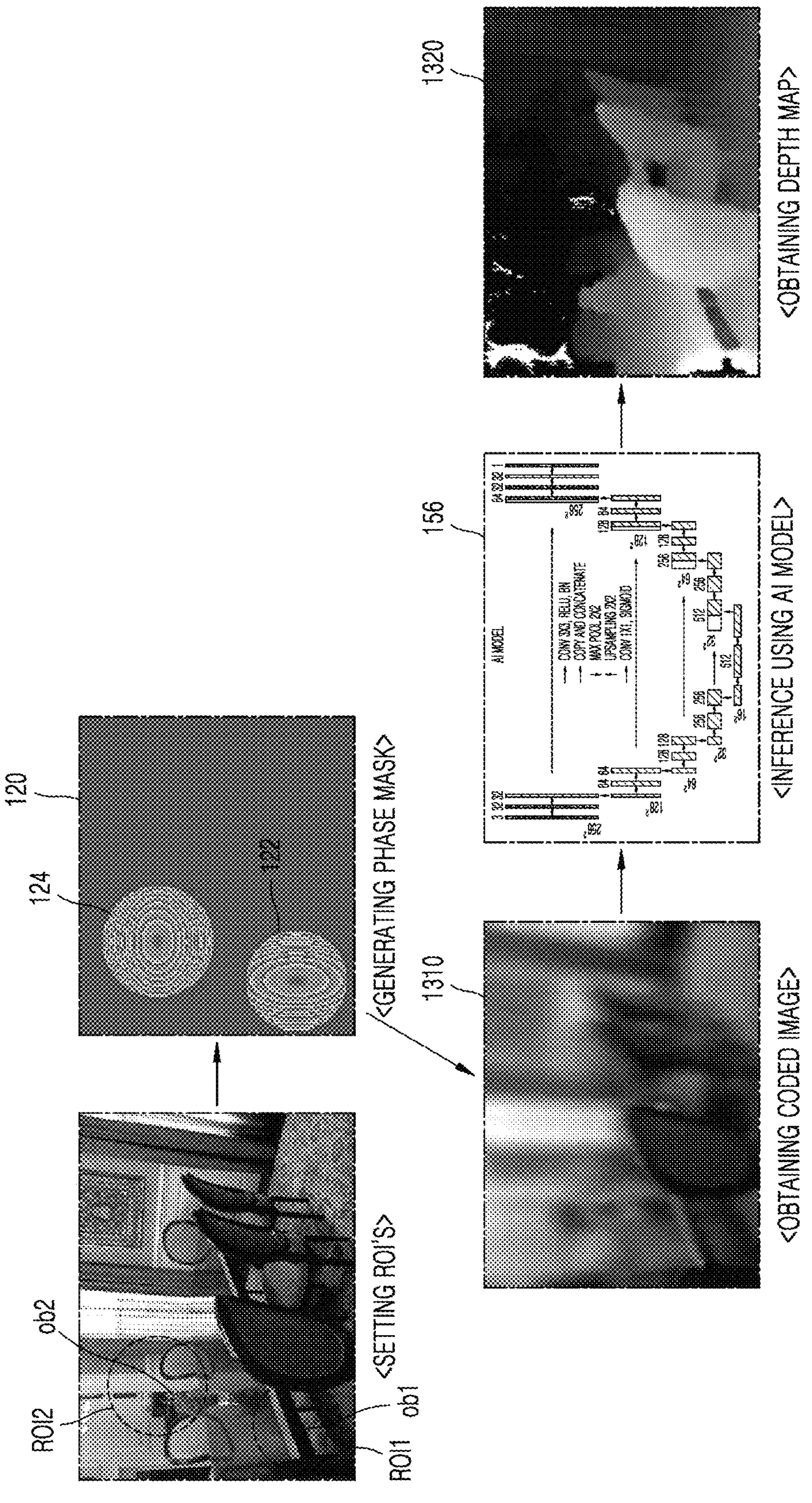
FIG. 13 is a conceptual diagram illustrating a process for obtaining a coded image by using phase masks and obtaining a depth map from the coded image, according to an embodiment of the present disclosure.

It must be understood that while red, green, blue, and depth (RGB-D) images, coded images, and depth maps shown in FIGS. 1 and 13 of the accompanying drawings of the present disclosure are examples of images, and reference is made to NYU Depth Dataset V2 (Nathan Silberman et al., https://es.nyu.edu/~silberman/datasets/nyu_depth_v2.html)), this disclosure is not limited thereto.

An embodiment of the present disclosure will be described more fully hereinafter with reference to the accompanying drawings so that the embodiment may be easily implemented by a person of ordinary skill in the art. However, the present disclosure may be implemented in different forms and should not be construed as being limited to embodiments set forth herein.

Hereinafter, embodiments of the present disclosure are described in detail with reference to the accompanying drawings.

FIG. 1 is a conceptual diagram illustrating a process in which an electronic device 100 obtains a coded image 10 by using a phase mask 122 and obtains a depth map 20 from the obtained coded image 10.

Referring to FIG. 1, the electronic device 100 may include a lens assembly 110, an active mask panel 120, and an image sensor 130. The electronic device 100 may capture an image of objects ob1 and ob2 through the lens assembly 110 and obtain a coded image 10 of the objects ob1 and ob2 via the image sensor 130. The lens assembly 110 is a lens optical system including at least one camera lens. Light passing through the lens assembly 110 is refracted when passing through the active mask panel 120, changes its path, and is received through the image sensor 130.

The electronic device 100 may apply an electrical driving signal to the active mask panel 120 to form a coded aperture pattern, and generate a phase mask 122 having the coded aperture pattern. The coded aperture pattern of the phase mask 122 includes a plurality of apertures having different shapes and sizes, the amount of light transmitted varies depending on an extent of opening of the plurality of apertures, and an amount of transmitted light causes focus distortion according to depths of the objects ob1 and ob2. The coded aperture pattern of the phase mask 122 may include apertures patterned such that, when light transmitted through the phase mask 122 is received by the image sensor 130, there is a specific correlation between a degree of distortion of an image and depth values of the objects ob1 and ob2. In an embodiment of the present disclosure, the phase mask 122 may be formed to have a coded aperture pattern of a shape and size that causes the distortion of the image to occur according to a point spread function (PSF) based on the depth values of the objects ob1 and ob2. The coded aperture pattern of the phase mask 122 may induce a phase delay of light by changing a refractive index of the light according to the depth value of the objects ob1 and ob2.

In an embodiment of the present disclosure, the active mask panel 120 may be implemented as an electrically tunable liquid crystal panel that changes an arrangement angle of liquid crystal molecules disposed in a region corresponding to a coded aperture according to an applied voltage value. The electrically tunable liquid crystal panel is a liquid crystal lens that determines whether light is transmitted based on changes in optical properties of liquid crystal, and is configured to locally adjust refractive power of light passing through liquid crystal molecules and modulate a phase of the light. However, the active mask panel 120 is not limited thereto, and may be implemented as a combination of a polarization-selective meta-lens and an active circular polarizer. In an embodiment of the present disclosure, the active mask panel 120 may be disposed between the lens assembly 110 and the image sensor 130 of the camera.

The image sensor 130 may obtain the coded image 10 by receiving light transmitted through the phase mask 122 of the active mask panel 120. The light reflected by the objects ob1 and ob2 reaches the phase mask 122 of the active mask panel 120 through the lens assembly 110 and is phase-modulated by changing a refractive index via the phase mask, and the phase-modulated light is received by a specific pixel on the image sensor 130. The electronic device 100 may obtain the coded image 10 by converting light received via the image sensor 130 into an electrical signal.

The coded image 10 may be an out-of-focus distorted image which is obtained using light with phase modulated according to the depth values of the objects ob1 and ob2. In an embodiment of the present disclosure, the coded image 10 may be a convolution image with focus distortion according to a PSF.

The electronic device 100 may obtain a depth map 20 by inputting the coded image 10 to an artificial intelligence (AI) model 156 and performing inference by using the AI model 156. The AI model 156 may be a deep neural network (DNN) model trained, via a supervised learning technique, by applying a plurality of previously obtained convolution images as input data and applying a plurality of depth maps respectively corresponding to the plurality of convolution images as output ground truth. In an embodiment of the present disclosure, the AI model 156 may be a U-Net, but is not limited thereto. The electronic device 100 may apply the coded image 10 as input data to the trained AI model 156 to obtain the depth map 20 representing depth values for each pixel in the coded image 10.

A phase mask used in a deconvolution method in related art is located in a part of a diaphragm of a camera, so it provides the same focus distortion effect to all light incident through the diaphragm. As a result, a depth map obtained by the conventional phase mask has problems of low resolution and low accuracy of pixel-wise depth values. Furthermore, because the phase mask in related art is formed by etching apertures in a specific pattern through methods such as photolithography, it is implemented as a passive mask in which an aperture pattern is physically fixed. Therefore, when using the phase mask in related art, there is a technical limitation in that the conventional phase mask cannot accurately measure depth values according to the characteristics of a shooting environment, e.g., for different depth ranges of the object ob1 and ob2.

According to an embodiment of the present disclosure, the electronic device 100 may generate the active phase mask 122 by using the active mask panel 120. The active phase mask panel may change a shape, size, and position of the aperture pattern in the active phase mask 122 according to an electrical driving signal, and obtain the depth map 20 from the coded image 10 obtained using the active phase mask 122. This enables measuring accurate depth values according to the depth values of the objects ob1 and ob2. Furthermore, because the active mask panel 120 according to an embodiment of the present disclosure is disposed between the lens assembly 110 and the image sensor 130 of the camera, it is possible to adaptively change the coded aperture pattern of the phase mask 122 according to the objects ob1 and ob2 having specific depths, rather than causing the same focus distortion for all light, obtaining the depth map 20 with improved accuracy and resolution.

Figure 2:
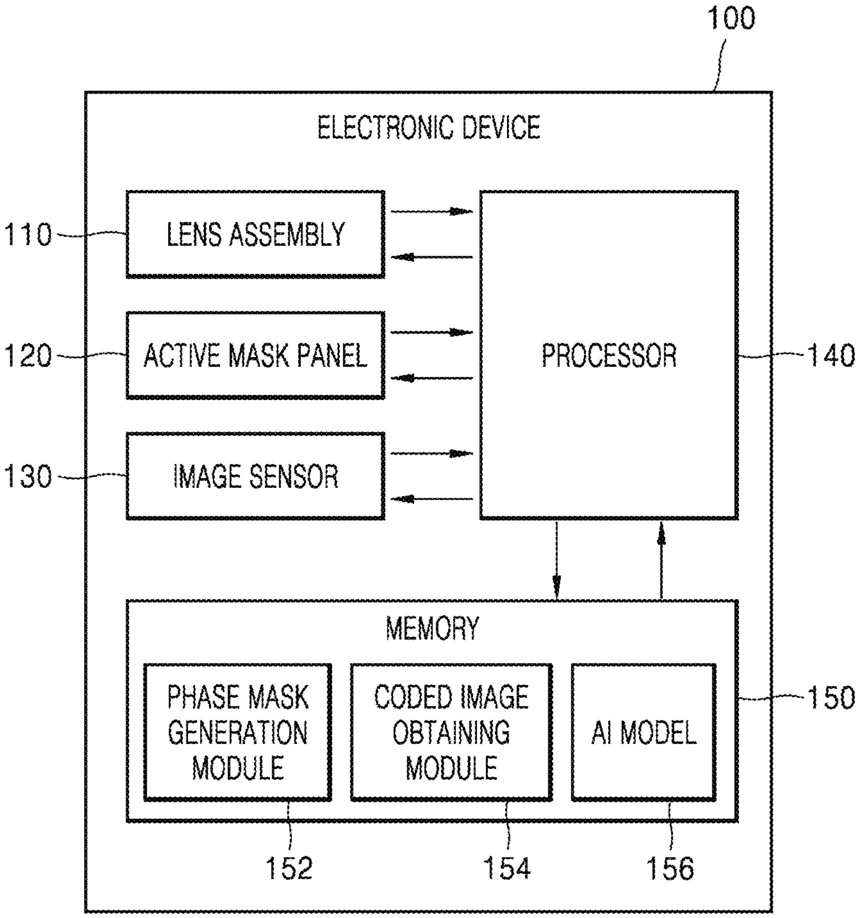
FIG. 2 is a block diagram of an electronic device according to an embodiment of the present disclosure.

FIG. 2 is a block diagram illustrating components of the electronic device 100 according to an embodiment of the present disclosure.

The electronic device 100 may be a device that obtains an image of a real-world object captured by using a camera including a lens assembly 110 and an image sensor 130. The electronic device 100 may be implemented as a variety of devices, such as a mobile device, a smartphone, a laptop computer, a desktop, a tablet computer, a wearable device, an e-book terminal, a digital broadcast terminal, a personal digital assistant (PDA), a portable multimedia player (PMP), a navigation device, an MP3 player, a camcorder, and the like. In an embodiment of the present disclosure, the electronic device 100 may be an augmented reality device. An augmented reality device is a device capable of realizing 'augmented reality' and may include not only eye glasses-shaped augmented reality glasses that are typically worn on a user's face, but also a head mounted display (HMD) apparatus (HMD) or an augmented reality helmet, which is worn on the head.

Referring to FIG. 2, the electronic device 100 may include a lens assembly 110, an active mask panel 120, an image sensor 130, a processor 140, and a memory 150. The lens assembly 110, the active mask panel 120, the image sensor 130, the processor 140, and the memory 150 may be electrically and/or physically connected to each other.

The components shown in FIG. 2 are only in accordance with an embodiment of the present disclosure, and the components included in the electronic device 100 are not limited to those shown in FIG. 2. The electronic device 100 may not include some of the components shown in FIG. 2, and may further include components not shown in FIG. 2. For example, the electronic device 100 may further include a power supply device (e.g. a battery) that provides driving power to the lens assembly 110, the active mask panel 120, the image sensor 130, the processor 140, and the memory 150. In another example, the electronic device 100 may further include a low resolution light detection and ranging (LiDAR) sensor that obtains depth value information of an object to be imaged.

The lens assembly 110 is a lens optical system including at least one camera lens. In an embodiment of the present disclosure, the lens assembly 110 may include a plurality of optical lenses having different focal lengths, aperture values (or f-numbers) (e.g., f/1.4, f/2, f/2.8, f/4, f/5.6, f/8, f/11, f/16, f/22, and f/32), diameters, and fields of view (FOVs). Light passing through the lens assembly 110 may be transmitted through the active mask panel 120.

The active mask panel 120 is a transmissive panel capable of variably forming a coded aperture according to an electrical driving signal. In an embodiment of the present disclosure, the active mask panel 120 may be an electrically tunable liquid crystal panel configured to, by changing an arrangement angle of liquid crystal molecules disposed in a region corresponding to the coded aperture according to an applied voltage value, locally adjust a refractive index of light transmitted through the liquid crystal molecules and modulate the phase of light. The electrically tunable liquid crystal panel may be implemented as a transmissive liquid crystal lens that transmits light that has passed through the lens assembly 110. A location of the region where the coded aperture is formed is not fixed on the active mask panel 120 and may be changed. A control voltage applied to the active mask panel 120 may be controlled by the processor 140 and applied to the active mask panel 120 by a voltage control circuit. An embodiment in which the refractive power of a region corresponding to a coded aperture is changed by applying a control voltage is described in detail with reference to FIGS. 6A and 6B.

However, the active mask panel 120 is not limited thereto, and may be implemented as a combination of a polarization-selective meta-lens and an active circular polarizer.

The image sensor 130 is an imaging element configured to receive light transmitted through the active mask panel 120, convert luminance or intensity of the received light into an electrical signal, and image the electrical signal, obtaining a coded image. The image sensor 130 may be implemented as, for example, a charge-coupled device (CCD) or complementary metal-oxide-semiconductor (CMOS), but is not limited thereto.

The processor 140 may execute one or more instructions or program code stored in the memory 150 and perform functions and/or operations corresponding to the instructions or program code. The processor 140 may be composed of hardware components that perform arithmetic, logic, and input/output (I/O) operations, and signal processing. The processor 140 may consist of at least one of, for example, a CPU, a microprocessor, a graphics processing unit (GPU), an AP, application specific integrated circuits (ASICs), digital signal processors (DSPs), digital signal processing devices (DSPDs), programmable logic devices (PLDs), and field programmable gate arrays (FPGAs), but is not limited thereto.

The processor 140 is shown as an element in FIG. 2, but is not limited thereto. In an embodiment, the processor 140 may be configured as a single processor or a plurality of processors. The processor 140 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing variety of the recited/disclosed functions, e.g., in a distributed manner. At least one processor may execute program instructions to achieve or perform various functions.

In an embodiment of the present disclosure, the processor 140 may be configured as a dedicated hardware chip that performs AI training.

The memory 150 may store instructions, algorithms and program code readable by the processor 140. The memory 150 may include, for example, at least one of a flash memory-type memory, a hard disk-type memory, a multimedia card micro-type memory, a card-type memory (e.g., an Secure Digital (SD) card or an extreme Digital (XD) memory), random access memory (RAM), static RAM (SRAM), read-only memory (ROM), electrically erasable programmable ROM (EEPROM), PROM, mask ROM, flash ROM, a hard disk drive (HDD), or a solid state drive (SSD).

The memory 150 may store instructions or program code for performing functions or operations of the electronic device 100. In an embodiment of the present disclosure, the memory 150 may store at least one of instructions, algorithms, data structures, program code, and application programs readable by the processor 140. The instructions, algorithms, data structures, and program code stored in the memory 150 may be implemented in programming or scripting languages such as C, C++, Java, assembler, etc.

The memory 150 may store instructions, algorithms, data structures, or program code related to a phase mask generation module 152, a coded image obtaining module 154, and an AI model 156. A "module" included in the memory 150 refers to a unit for processing a function or operation operated by the processor 140, and may be implemented as software such as instructions, algorithms, data structures, or program code.

In the following embodiment, the processor 140 may be implemented by executing instructions or program code stored in the memory 150.

The phase mask generation module 152 may be composed of instructions or program code related to an operation and/or a function of generating a phase mask having a coded aperture pattern by controlling an electrical driving signal applied to the active mask panel 120. The processor 140 may execute the instructions or program code related to the phase mask generation module 152 to generate a phase mask having a coded aperture pattern on the active mask panel 120. The coded aperture pattern of the phase mask may include a plurality of apertures having different shapes and sizes. The amount of light transmitted through the phase mask may vary depending on an extent of opening of the plurality of apertures included in the phase mask, and an amount of light transmitted may cause focus distortion according to a depth of an object. The processor 140 may apply an electrical driving signal to the active mask panel 120 and pattern an aperture so that, when the light transmitted through the phase mask is received by the image sensor 130, a specific correlation is present between a degree of distortion of an image and a depth value of the object. In an embodiment of the present disclosure, the processor 140 may control the active mask panel 120 to generate a phase mask having a coded aperture pattern which causes a signal value for each pixel obtained by the image sensor 130 to be distorted or modulated according to a PSF based on a depth value of the object. The coded aperture pattern of the phase mask may be a pattern including a plurality of apertures that induce a phase delay of light by changing a refractive index of the light according to a depth value of the object. The coded aperture pattern of the phase mask is described in detail with reference to FIG. 5.

In an embodiment of the present disclosure, the processor 140 may generate a control voltage waveform with a phase modulation profile for generating the phase mask, and control a power supply device (e.g., a battery) to apply the generated control voltage waveform to the active mask panel 120. The shape, size, and position of the plurality of apertures included in the phase mask may be changed based on the control voltage waveform applied according to control by the processor 140.

The processor 140 may generate at least one phase mask on the active mask panel 120. The processor 140 may generate a plurality of phase masks including different coded aperture patterns on the active mask panel 120. In an embodiment of the present disclosure, the processor 140 may generate a first phase mask in a partial area of the entire region of the active mask panel 120, and generate a second phase mask in another area of the entire region of the active mask panel 120 where the first phase mask is not formed. The first phase mask may include a pattern having a plurality of apertures for obtaining a coded image having a first PSF corresponding to a first depth value, and the second phase mask may include a pattern having a plurality of apertures for obtaining a coded image having a second PSF corresponding to a second depth value. A 'coded aperture pattern corresponding to a PSF' means a coded aperture pattern optimized to obtain a highly reliable coded image by maximizing a focus distortion caused by the PSF at a specific depth value. A specific embodiment in which the processor 140 generates a plurality of phase masks on the active mask panel 120 is described in detail with reference to FIG. 9.

In an embodiment of the present disclosure, the processor 140 may set a region of interest (ROI) among objects to be imaged, obtain a depth value of an object included in the ROI, and generate a phase mask having a coded aperture pattern for obtaining a coded image having a PSF corresponding to the obtained depth value of the object. In an embodiment of the present disclosure, the electronic device 100 may include a user input unit receiving a user input, and the processor 140 may set an ROI based on a user input received via the user input unit. In another embodiment of the present disclosure, the electronic device 100 is implemented as an augmented reality device, and the augmented reality device may include an eye-tracking sensor that detects a gaze point at which the gaze directions of the two eyes of the user converge by tracking gaze directions of two eyes of the user. In this case, the processor 140 may detect a gaze point by using the user's eye-tracking data obtained using the eye-tracking sensor and set an ROI based on a position of the gaze point. The processor 140 may obtain a depth value of an object included in the ROI and generate a phase mask having a coded aperture pattern for obtaining a coded image having a PSF corresponding to the depth value of the object.

In an embodiment of the present disclosure, the electronic device 100 may further include a low resolution LiDAR sensor for obtaining a depth value of an object. A specific embodiment in which the processor 140 sets an ROI and generates a phase mask for obtaining a coded image having a PSF corresponding to a depth value of an object included in the ROI is described in detail with reference to FIGS. 11 and 12.

In an embodiment of the present disclosure, the processor 140 may generate a coded aperture pattern in an area corresponding to the ROI in the entire region of the active mask panel 120.

The coded image obtaining module 154 is composed of instructions or program code related to an operation and/or a function of obtaining a coded image by receiving, via the image sensor 130, light transmitted through the active mask panel 120. The processor 140 may execute the instructions or program code related to the coded image obtaining module 154 to obtain a coded image. Light related to the object reaches the phase mask of the active mask panel 120 through the lens assembly 110 and is phase-modulated by changing a refractive index via the phase mask, and the phase-modulated light is received by a specific pixel on the image sensor 130. By using the image sensor 130, the processor 140 may receive light transmitted through the phase mask of the active mask panel 120 and convert information about luminance or intensity of the received light into an electrical signal, thereby obtaining a coded image.

In the present disclosure, a 'coded image' is an image obtained using light whose phase is modulated according to a depth value of an object, and may be an out-of-focus image with distorted focus. In an embodiment of the present disclosure, the coded image may be a convolution image with focus distortion caused by a PSF.

The AI model 156 may be a model trained to extract a depth map from the convolution image. In an embodiment of the present disclosure, the AI model 156 may be a DNN model trained, via a supervised learning technique, by applying a plurality of previously obtained convolution images as input data and applying a plurality of depth maps respectively corresponding to the plurality of convolution images as output ground truth. 'Training' may refer to training a neural network to discover or learn on its own a method of analyzing pieces of input data to the neural network, a method of classifying the pieces of input data, and/or a method of extracting features necessary for generating resultant data from the pieces of input data. In detail, through the training process, the DNN model may optimize weight values inside the neural network by being trained using training data (e.g., the plurality of convolution images and the plurality of depth maps). The DNN model outputs a desired result by processing input data via the neural network having the optimized weight values. A specific embodiment related to training an AI model is described in detail with reference to FIG. 7.

In an embodiment of the present disclosure, the AI model 156 may be a U-Net. However, the AI model 156 is not limited thereto, and in another embodiment, the AI model 156 may be implemented as one of a convolutional neural network (CNN), a recurrent neural network (RNN), a restricted Boltzmann machine (RBM), a deep belief network (DBN), a bidirectional recurrent DNN (BRDNN), and a deep Q-network (DQN). Furthermore, the AI model may be subdivided. Furthermore, a CNN may be subdivided into a deep CNN (DCNN), a capsule neural network (Capsnet) (not shown), or the like.

The processor 140 may obtain a depth map from the coded image by using the trained AI model 156. In an embodiment of the present disclosure, the processor 140 may obtain a depth map corresponding to the coded image by inputting the coded image obtained via the image sensor 130 to the AI model 156 and performing inference using the AI model 156 A specific embodiment in which the processor 140 obtains a depth map from a coded image by using the AI model 156 is described in detail with reference to FIG. 8.

In FIG. 2, the AI model 156 is shown as being stored in the memory 150 of the electronic device 100, but is not limited thereto. In another embodiment of the present disclosure, the AI model 156 may be stored in an external server rather than in the electronic device 100. In this case, the electronic device 100 may further include a communication interface capable of performing data communication with the external server, and may receive the AI model 156 or resultant data (e.g., a depth map) from the inference by the AI model 156 from the external server via the communication interface. In general, the electronic device 100 may have limited memory storage capacity, limited computation processing speed, limited training data set collection capability, etc., compared to a server. Thus, the server may perform operations requiring storage of a large amount of data and a large number of computations, and then transmit necessary data and/or the AI model 156 to the electronic device 100 via a communication network. In this case, the electronic device 100 may receive and utilize the AI model 156 or data as a result of inference by the AI model 156 via the server to thereby quickly and easily perform necessary operations, without a large capacity memory and a processor with high-speed computation capability.

Figure 3:
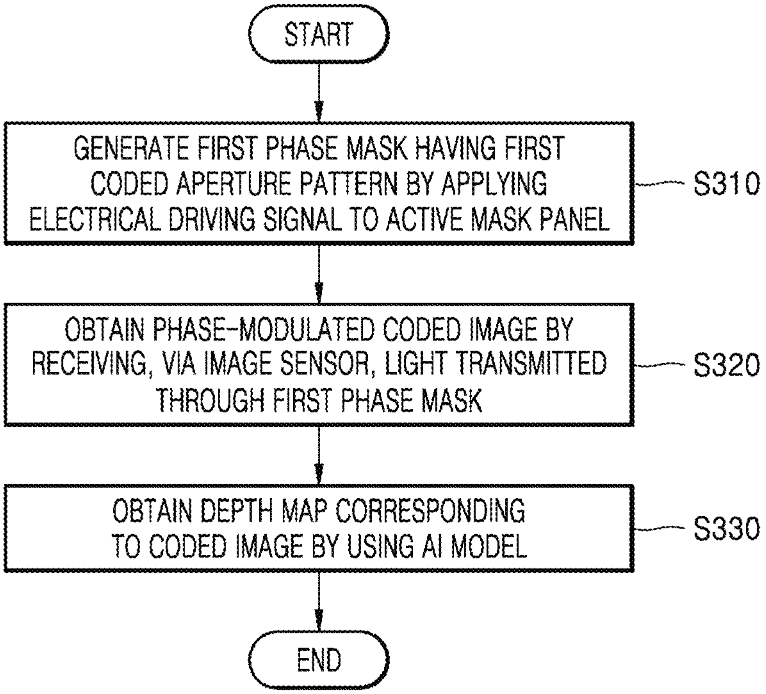
FIG. 3 is a flowchart of a process to obtain a depth map, according to an embodiment of the present disclosure.

FIG. 3 is a flowchart of a method operated by the electronic device 100, according to an embodiment of the present disclosure.

In operation S310, the electronic device 100 generates a first phase mask having a first coded aperture pattern by applying an electrical driving signal to an active mask panel. In an embodiment of the present disclosure, the active mask panel may be implemented as an electrically tunable liquid crystal panel that changes an arrangement angle of liquid crystal molecules disposed in a region corresponding to a coded aperture according to an applied voltage value. The electrically tunable liquid crystal panel is a liquid crystal lens that determines whether light is transmitted based on changes in optical properties of liquid crystal, and is configured to locally adjust refractive power of light passing through liquid crystal molecules and modulate the phase of the light. The electronic device 100 may apply an electrical driving signal to the active mask panel and pattern an aperture so that, when light transmitted through the first phase mask is received by the image sensor (e.g., 130 of FIG. 2), a degree of distortion of an image and a depth value of an object have a specific correlation. In an embodiment of the present disclosure, the electronic device 100 may control the active mask panel to generate the first phase mask having a coded aperture pattern which induces pixel-wise signal values obtained by the image sensor 130 to be distorted or modulated according to a PSF based on a depth value of the object.

In an embodiment of the present disclosure, the electronic device 100 may form a coded aperture pattern locally in a partial area (also referred to as a first partial area) of the entire region of the active mask panel, and the first phase mask may be generated in the partial area of the active mask panel.

In operation S320, the electronic device 100 obtains a phase-modulated coded image by receiving, via the image sensor 130, light transmitted through the first phase mask. Light related to the object reaches the first phase mask and is phase-modulated by changing a refractive index via the first phase mask, and the phase-modulated light is received by a specific pixel on the image sensor 130. By using the image sensor 130, the electronic device 100 may receive light transmitted through the first phase mask of the active mask panel and convert information about luminance or intensity of the received light into an electrical signal, thereby obtaining the coded image.

In an embodiment of the present disclosure, the coded image may be a convolution image with focus distortion caused by a PSF.

In operation S330, the electronic device 100 obtains a depth map corresponding to the coded image by using the AI model (e.g., 156 of FIG. 2). In an embodiment of the present disclosure, the AI model 156 may be a DNN model trained, via a supervised learning technique, by applying a plurality of previously obtained convolution images as input data and applying a plurality of depth maps respectively corresponding to the plurality of convolution images as output ground truth. In an embodiment of the present disclosure, the AI model 156 may be a U-Net, but is not limited thereto. The electronic device 100 may obtain a depth map corresponding to the coded image by inputting the coded image obtained via the image sensor 130 to the AI model 156 and performing inference using the AI model 156.

Figure 4:
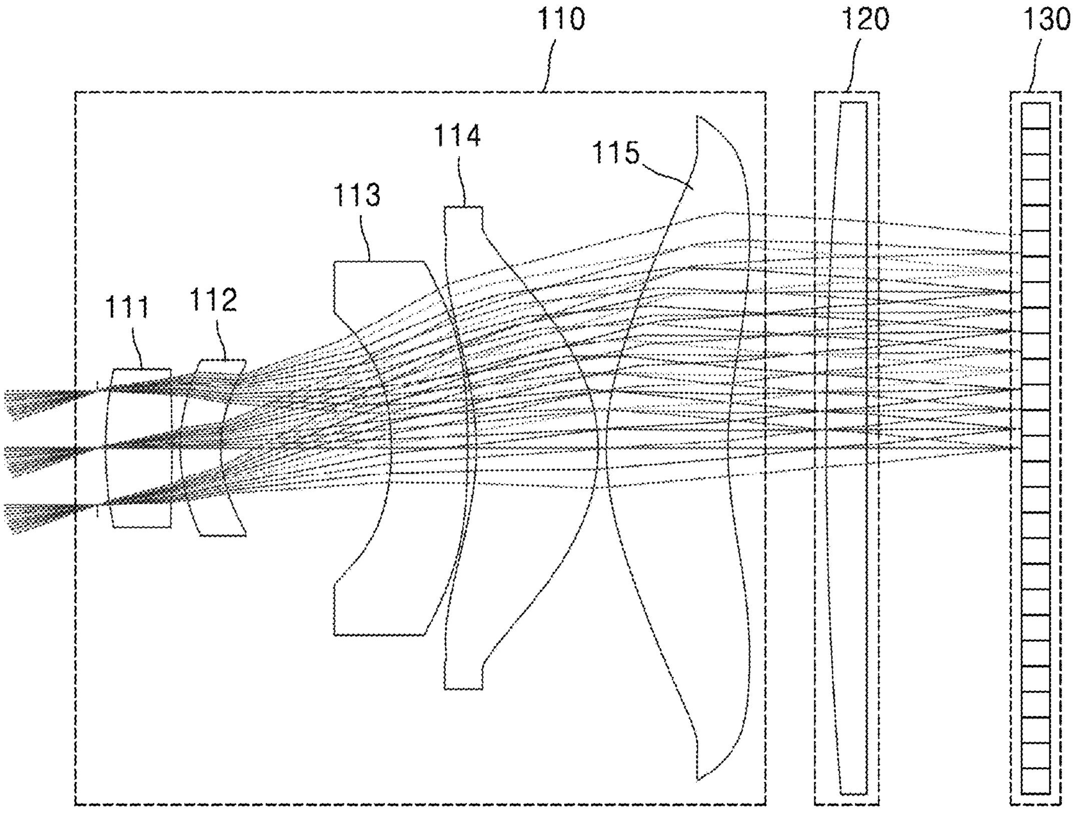
FIG. 4 is a diagram illustrating an exemplary lens assembly, active mask panel, and image sensor included in an electronic device, according to an embodiment of the present disclosure.

FIG. 4 is a diagram illustrating structures of the lens assembly 110, the active mask panel 120, and the image sensor 130 included in the electronic device 100, according to an embodiment of the present disclosure.

Referring to FIG. 4, the electronic device 100 may include the lens assembly 110, the active mask panel 120, and the image sensor 130.

The lens assembly 110 is a lens optical system including a plurality of camera lens 111 to 115. In the embodiment illustrated in FIG. 4, each of the plurality of camera lenses 111 to 115 included in the lens assembly 110 may be an optical lens with a different focal length, aperture value, diameter, and FOV. Light passing through the lens assembly 110 may be refracted or diffracted to reach the active mask panel 120.

The active mask panel 120 may be disposed between the lens assembly 110 and the image sensor 130. Light related to an object reaches the phase mask of the active mask panel 120 through the lens assembly 110 and is phase-modulated by changing a refractive index via the phase mask. The phase-modulated light is received by a specific pixel on the image sensor 130. Because the material properties, operation and/or function of the active mask panel 120 are the same as those described with reference to FIG. 2, redundant descriptions are omitted herein.

The image sensor 130 may receive light phase-modulated by the phase mask of the active mask panel 120. The image sensor 130 may obtain a coded image by converting luminance or intensity of the received light into an electrical signal and converting the electrical signal into an image.

A phase mask in related art is located in a part of a diaphragm of a camera, so it provides the same focus distortion effect to all light incident through the diaphragm. Thus, a depth map obtained via the phase mask in related art has problems of low resolution and low accuracy of pixel-wise depth values.

The electronic device 100, according to the embodiment illustrated in FIG. 4 may have the active mask panel 120 disposed between the lens assembly 110 and generating an active phase mask in a specific region on the active mask panel 120. This enables adaptively changing a coded aperture pattern of the active mask panel 120 according to an object having a specific depth, rather than causing the same focus distortion. Thus, according to an embodiment of the present disclosure, the electronic device 100 may obtain a depth map with improved accuracy and resolution. Further, the electronic device 100 may be designed in a smaller form factor than a conventional camera including a LiDAR sensor, and may implement a depth obtaining camera that consumes less power.

Figure 5:
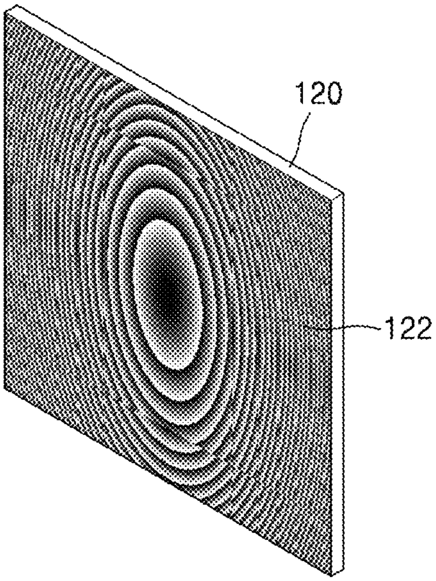
FIG. 5 illustrates a phase mask of an active mask panel, according to an embodiment of the present disclosure.

FIG. 5 illustrates the phase mask 122 of the active mask panel 120, according to an embodiment of the present disclosure.

Referring to FIG. 5, the phase mask 122 may be formed on the active mask panel 120. The phase mask 122 may include a coded aperture pattern with a plurality of apertures having different shapes and sizes. The shape, size, and position of the plurality of apertures included in the coded aperture pattern may be changed according to a control voltage waveform applied by the processor (e.g., 140 of FIG. 2) of the electronic device 100. Accordingly, the coded aperture pattern of the phase mask 122 may be changed, and a position thereof may be adjusted.

The coded aperture pattern of the phase mask 122 may be a pattern including a plurality of apertures that induce a phase delay of light by changing a refractive index of the light according to a depth value of an object. The amount of light transmitted through the phase mask 122 may vary depending on an extent of opening of the plurality of apertures included in the phase mask 122, and the amount of light transmitted may cause focus distortion according to a depth of an object. The processor 140 may apply an electrical driving signal to the active mask panel 120 and pattern an aperture so that, when the light transmitted through the phase mask 122 is received by the image sensor (e.g., 130 of FIG. 2), there is a specific correlation between a degree of distortion of an image and a depth value of the object. In an embodiment of the present disclosure, the processor 140 may generate the phase mask 122 having the coded aperture pattern which induces a signal value for each pixel obtained by the image sensor 130 to be distorted or modulated according to a PSF according to a depth value of the object.

In an embodiment of the present disclosure, the active mask panel 120 may be an electrically tunable liquid crystal panel configured to form a plurality of apertures in a region corresponding to the coded aperture pattern according to an applied voltage value. In this case, the plurality of apertures included in the coded aperture pattern of the phase mask 122 may be formed when an arrangement angle of liquid crystal molecules included in the active mask panel is changed according to a phase modulation profile of the control voltage waveform applied by the processor (e.g., 140 of FIG. 2). A specific embodiment in which a coded aperture pattern is formed when an arrangement angle of liquid crystal molecules included in the active mask panel 120 is changed is described in detail with reference to FIGS. 6A and 6B.

Figure 6A:
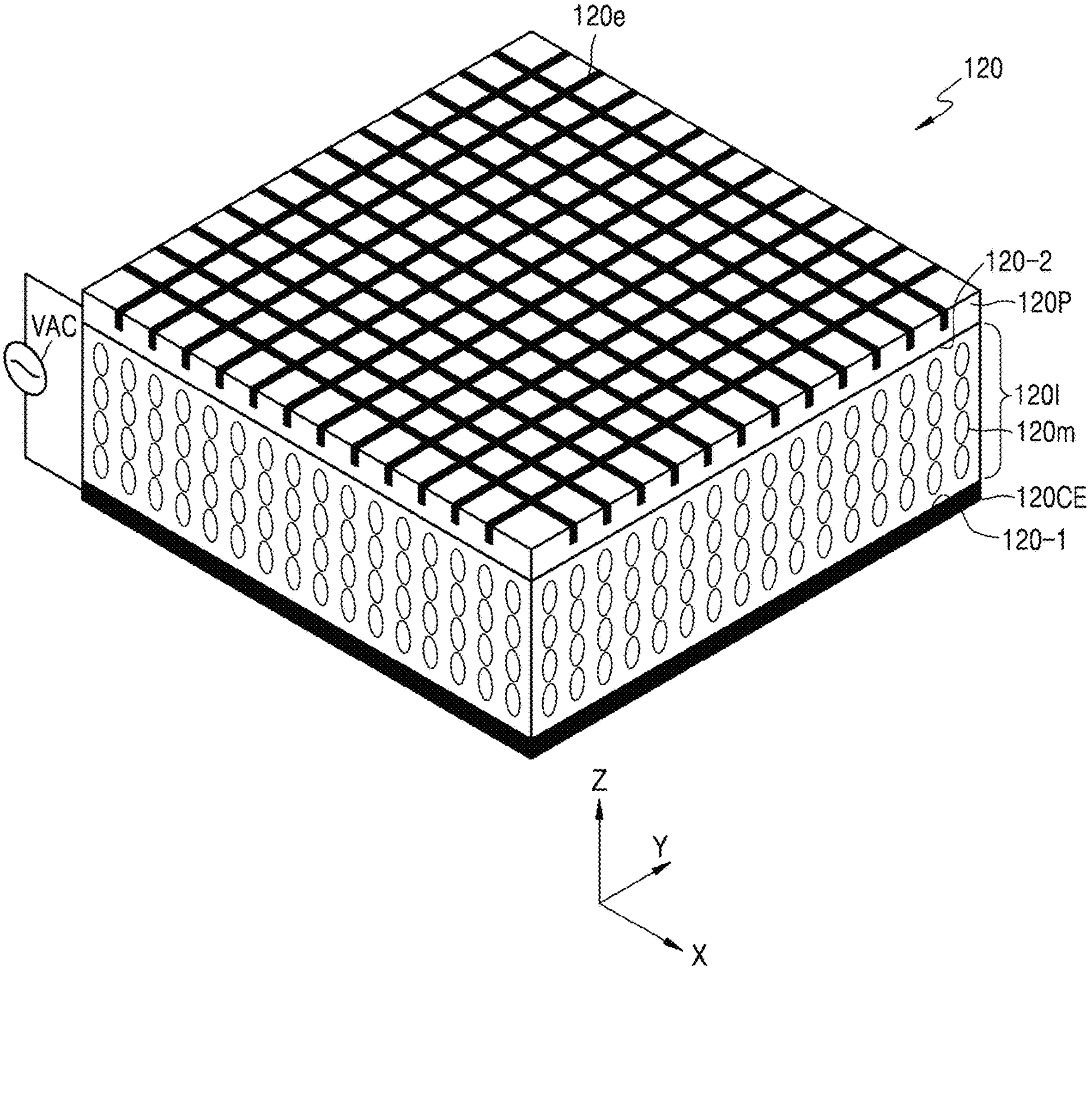
FIG. 6A is a perspective view of an active mask panel, according to an embodiment of the present disclosure.

FIG. 6A is a perspective view of an active mask panel 120, which is a component of the electronic device 100, according to an embodiment of the present disclosure.

Referring to FIG. 6A, the active mask panel 120 may include a liquid crystal layer 120*l*, a common electrode 120CE, a transparent film 120P, and excitation electrodes 120*e*. The active mask panel 120 may further include a transparent layer formed in contact with a bottom surface of the common electrode 120CE.

The active mask panel 120 may be an electrically tunable liquid crystal panel capable of adjusting a refractive index of light by changing an arrangement angle of liquid crystal molecules 120*m* based on a control voltage applied via the excitation electrodes 120*e* from a power supply device VAC. In an embodiment, the active mask panel 120 may include an electro-optic material with a pixel grid. Pixels may be arranged in a matrix of N rows and M columns. Each of the N×M pixels may accommodate a set of possible values (gray levels) that are independent of all other pixels.

The liquid crystal layer 120*l* may be an electro-optic layer including a plurality of liquid crystal molecules 120*m*. The liquid crystal layer 120*l* may be an electro-optic layer in which properties of liquid crystals are changed by an applied control voltage. In an embodiment, the liquid crystal layer 120*l* may include a polarization-independent liquid crystal layer (e.g., cholesteric liquid crystals). In the liquid crystal layer 120*l*, the arrangement angle of the liquid crystal molecules 120*m* disposed within a specific area in an active region may be changed according to a control voltage applied via the excitation electrodes 120*e*, so that a refractive index of the specific area may be locally adjusted.

The common electrode 120CE and the excitation electrodes 120*e* may receive control voltages from the power supply device VAC and apply the supplied control voltages to the liquid crystal layer 120*l*. The common electrode 120CE may be arranged to contact a first surface 120-1 of the liquid crystal layer 120*l*.

The excitation electrodes 120*e* may be arranged to contact a top surface of the transparent film 120P on a second surface 120-2 opposite to the first surface 120-1 of the liquid crystal layer 120*l*. The excitation electrodes 120*e* may include first array excitation electrodes and second array excitation electrodes oriented orthogonally along X-axis and Y-axis directions on the top surface of the transparent film 120P. The first array excitation electrodes and the second array excitation electrodes may each include parallel strips of a conductive material extending over the active region. In an embodiment of the present disclosure, the excitation electrodes 120*e* may be formed of a transparent conductive material such as indium tin oxide (ITO).

A pixel may be defined by an area where strips of the first array excitation electrodes and strips of the second array excitation electrodes overlap. A center-to-center distance between areas defined by strips of the first array excitation electrodes and strips of the second array excitation electrode may define a pitch of a pixel array, and a width of the strips may define a size of a pixel.

The processor (e.g., 140 of FIG. 2) of the electronic device 100 may apply a control voltage waveform with a phase modulation profile to the excitation electrodes 120*e* via the power supply device VAC, and modulate the control voltage applied to the excitation electrodes 120*e*. When the control voltage having a waveform modulated by the processor 140 is applied to the active mask panel 120, the refractive power in a specific area within the active region of the active mask panel 120 may be locally adjusted by the phase modulation profile of the applied control voltage. The active mask panel 120 may form a plurality of apertures according to the adjusted refractive power. In an embodiment of the present disclosure, the active mask panel 120 may adjust a shape, size, and position of the apertures by adjusting the refractive power, and form a coded aperture pattern. The active mask panel 120 may change a path of light rays or light transmitted through the plurality of apertures included in the coded aperture pattern.

The processor 140 may form a phase mask by adjusting the refractive power of a pattern, i.e., a coded aperture pattern, including the plurality of apertures in the active mask panel 120. A specific method, operated by the processor 140, of forming a phase mask having a coding aperture pattern of the active mask panel 120 is described in detail with reference to FIG. 6B.

Figure 6B:
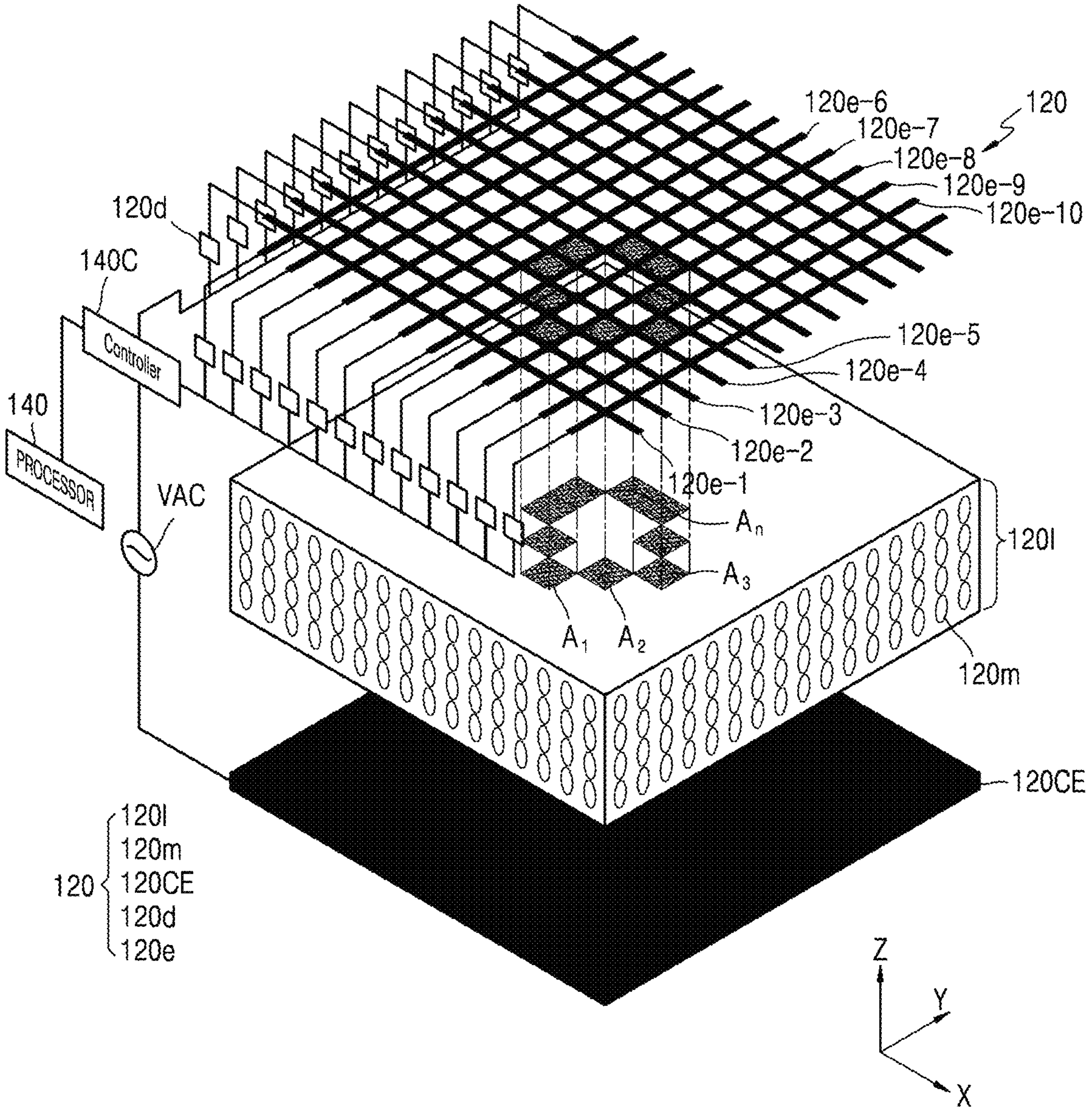
FIG. 6B is a perspective view illustrating layers involved in forming a plurality of apertures in an active mask panel, according to an embodiment of the present disclosure.

FIG. 6B is a diagram illustrating layers involved in forming a coded aperture pattern including a plurality of apertures $A_1$ to $A_n$ in an active mask panel 120, according to an embodiment of the present disclosure.

Referring to FIG. 6B, the active mask panel 120 may include a liquid crystal layer 120*l*, liquid crystal molecules 120*m*, a common electrode 120CE, a plurality of driver terminals 120*d*, a plurality of first array excitation electrodes 120*e*-1 to 120*e*-5, a plurality of second array excitation electrodes 120*e*-6 to 120*e*-10, and a transparent film 120P. In FIG. 6B, unlike in FIG. 6A, the transparent film 120P is not shown for convenience of description.

The plurality of first array excitation electrodes 120*e*-1 to 120*e*-5 may be arranged in the X-axis direction, and the plurality of second array excitation electrodes 120*e*-6 to 120*e*-10 may be arranged in the Y-axis direction. The plurality of first array excitation electrodes 120e-1 to 120e-5 and the plurality of second array excitation electrodes 120e-6 to 120e-10 may be arranged to be orthogonal to each other.

The plurality of driver terminals 120d for controlling a control voltage applied to the plurality of first array excitation electrodes 120e-1 to 120e-5 from the power supply device VAC may be respectively connected to the plurality of first array excitation electrodes 120e-1 to 120e-5. The plurality of driver terminals 120d for controlling a control voltage applied to the plurality of second array excitation electrodes 120e-6 to 120e-10 from the power supply device VAC may be respectively connected to the plurality of second array excitation electrodes 120e-6 to 120e-10.

A controller 140C may be electrically and/or physically connected to the plurality of driver terminals 120d and the power supply device VAC. In FIG. 6B, the controller 140C is shown as a component separate from the processor 140, but is not limited thereto. In an embodiment of the present disclosure, the controller 140C and the processor 140 may be integrated into a single component.

The controller 140C may control the plurality of driver terminals 120d to control a control voltage applied to the plurality of first array excitation electrodes 120e-1 to 120e-5 and the plurality of second array excitation electrodes 120e-6 to 120e-10, to adjust an arrangement angle of liquid crystal molecules disposed in a specific area. Unlike as illustrated in FIG. 6B, in another embodiment of the present disclosure, the active mask panel 120 may not include the plurality of driver terminals 120d, and the controller 140C may be directly coupled to the plurality of first array excitation electrodes 120e-1 to 120e-5 and the plurality of second array excitation electrodes 120e-6 to 120e-10.

The processor 140 may determine position values of a plurality of apertures that induce a signal value for each pixel obtained by the image sensor 130 to be distorted or modulated according to a PSF based on a depth value of an object. In an embodiment of the present disclosure, the processor 140 may calculate position coordinate values for each of the plurality of apertures forming a coded aperture pattern in the entire region of the active mask panel 120, and provide information regarding the calculated position coordinate values to the controller 140C. The controller 140C may determine a target area in which to form the plurality of apertures $A_1$ to $A_n$, based on the position coordinate values obtained from the processor 140.

In the embodiment illustrated in FIG. 6B, in order to change an arrangement angle of liquid crystal molecules disposed in an area corresponding to each of the plurality of apertures $A_1$ to $A_n$ among the plurality of liquid crystal molecules 120m included in the liquid crystal layer 120l, it is necessary to control a voltage to be applied to at least one excitation electrode among the plurality of first array excitation electrodes 120e-1 to 120e-5 and at least one excitation electrode among the plurality of second array excitation electrodes 120e-6 to 120e-10. For example, in order to form the first aperture $A_1$, the controller 140C may control the plurality of driver terminals 120d to control the power supply device VAC to apply a voltage to the second excitation electrode 120e-2 and the third excitation electrode 120e-3 among the first array excitation electrodes 120e-1 to 120e-5 and apply a voltage to the seventh excitation electrode 120e-7 and the eighth excitation electrode 120e-8 among the plurality of second array excitation electrodes 120e-6 to 120e-10. In the same manner, in order to form the first aperture $A_2$, the controller 140C may control the plurality of driver terminals 120d to control the power supply device VAC to apply a voltage to the third excitation electrode 120e-3 and the fourth excitation electrode 120e-4 among the first array excitation electrodes 120e-1 to 120e-5 and apply a voltage to the eighth excitation electrode 120e-8 and the ninth excitation electrode 120e-9 among the plurality of second array excitation electrodes 120e-6 to 120e-10. The controller 140C may form the third to n-th apertures $A_3$ to $A_n$ in the same manner as for the first aperture $A_1$ and the second aperture $A_2$.

The controller 140C may not only control application or non-application of a control voltage from the power supply device VAC, but may also control a magnitude of the control voltage applied from the power supply device VAC. The controller 140C may adjust a size of an arrangement angle of liquid crystal molecules by controlling the magnitude of the applied control voltage. For example, when the controller 140C applies a control voltage of a first magnitude to the second excitation electrode 120e-2 through the plurality of driver terminals 120d, and applies, to the third excitation electrode 120e-3, a control voltage of a second magnitude that is greater than the first magnitude, the arrangement angle of liquid crystal molecules located in an area where the third excitation electrode 120e-3 is disposed in the entire region of the liquid crystal layer 120l may be adjusted to be greater than an arrangement angle of liquid crystal molecules located in an area where the second excitation electrode 120e-2 is disposed.

That is, by modulating the a phase profile of a control voltage applied to the plurality of first array excitation electrodes 120e-1 to 120e-5 and the plurality of second array excitation electrodes 120e-6 to 120e-10 via the plurality of driver terminals 120d, the controller 140C may determine the plurality of apertures $A_1$ to $A_n$ in which an arrangement angle of the liquid crystal molecules 120m is changed in the entire region of the liquid crystal layer 120l, and form a coded aperture pattern including the plurality of apertures $A_1$ to $A_n$.

In FIGS. 6A and 6B, the active mask panel 120 is shown and described as an electrically tunable liquid crystal panel including the first array excitation electrodes 120e-1 to 120e-5 and the second array excitation electrodes 120e-6 to 120e-10, but the active mask panel 120 of the present disclosure is not limited thereto. In another embodiment of the present disclosure, the active mask panel 120 may be implemented as a thin film transistor (TFT) active matrix array structure that performs pixel-wise phase modulation by changing or adjusting an arrangement angle of liquid crystal molecules corresponding to each of the pixels.

Figure 7:
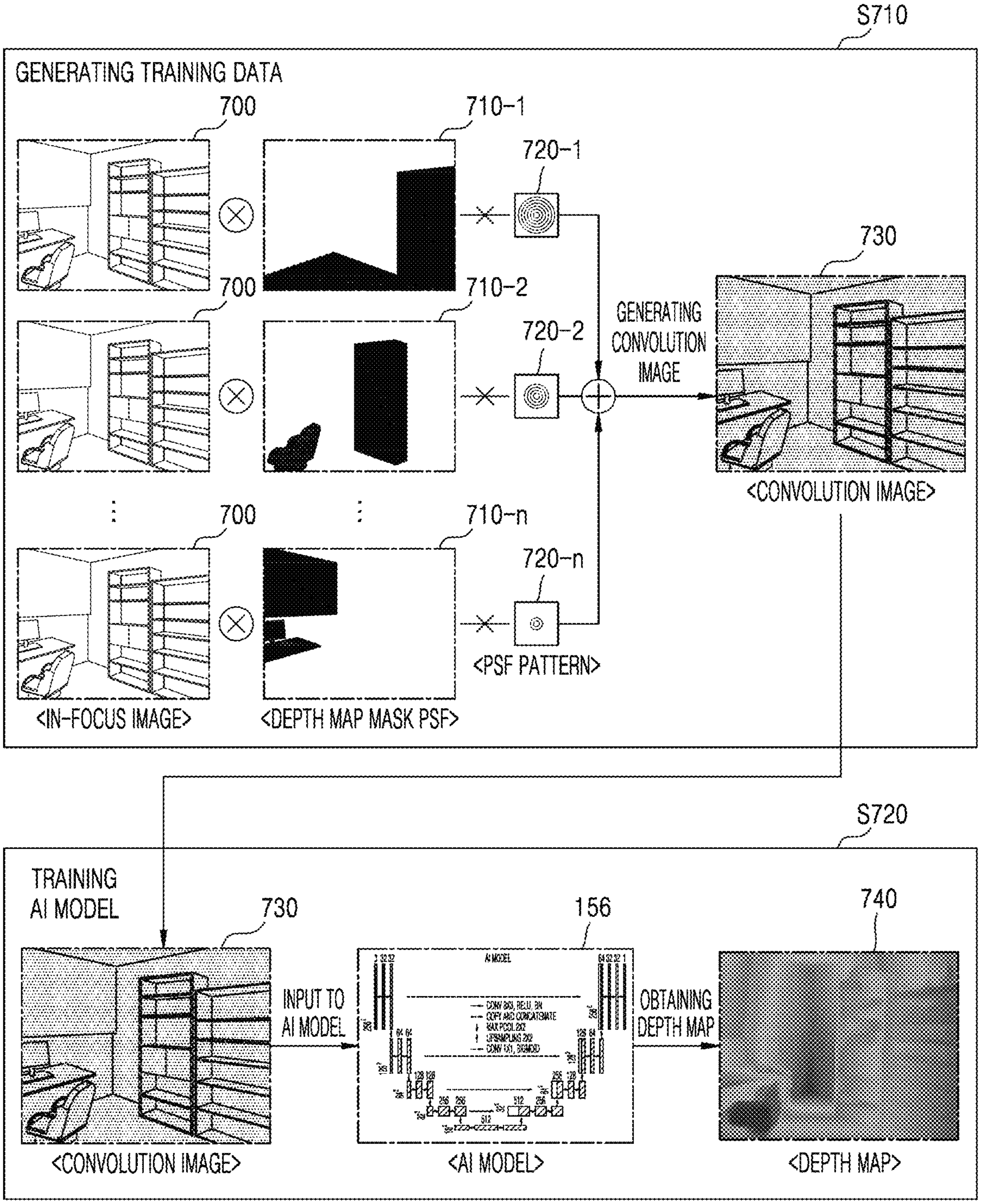
FIG. 7 is a diagram illustrating a process in which an electronic device generates training data and trains an artificial intelligence (AI) model by using the training data, according to an embodiment of the present disclosure.

FIG. 7 is a conceptual diagram illustrating a process in which the electronic device 100 generates training data and trains the AI model 156 by using the training data, according to an embodiment of the present disclosure.

Referring to FIG. 7, in operation S710, the electronic device 100 may generate training data. The electronic device 100 may generate training data by using an RGB-D image 700, depth map masks 710-1 to 710-n, and PSF patterns 720-1 to 720-n. In an embodiment of the present disclosure, the RGB-D image 700 may be an all-in-focus image in which individual focus is applied to all objects with different depth values included in an image. The RGB-D image 700 may include information regarding red (R), green (G), blue (B), and depth for each pixel. The RGB-D image 700 may be an image previously obtained as training data. Each of the depth map masks 710-1 to 710-n corresponds to each of the RGB-D images 700, and may be a mask pattern for objects having the same depth value. For example, the first depth map mask 710-1 may be a mask pattern corresponding to pixels having a first depth value in the RGB-D image 700, the second depth map mask 710-2 may be a mask pattern corresponding to pixels having a second depth value in the RGB-D image 700, and the n-th depth map mask **710-*n* may be a mask pattern corresponding to pixels having an n-th depth value in the RGB-D image 700**.

The processor (e.g., 140 of FIG. 2) of the electronic device 100 may obtain a convolution image 730 by perform convolution the RGB-D image 700 with the PSF patterns 720-1 to **720-*n* respectively corresponding to depth values of the RGB-D image 700. The processor 140 may determine pixels having a specific depth value by synthesizing the RGB-D image 700 with each of the depth map masks 710-1 to 710-*n*, and perform convolution a synthesized image with each of the plurality of PSF patterns 720-1 to 720-*n* having different patterns according to the depth value. In the embodiment illustrated in FIG. 7, the processor 140 may obtain a synthesized image composed of pixels having the first depth value by synthesizing the RGB-D image 700 with the first depth map mask 710-1, and perform convolution the synthesized image with the first PSF pattern 720-1 corresponding to the first depth value. The processor 140 may obtain a synthesized image composed of pixels having the second depth value by synthesizing the RGB-D image 700 with the second depth map mask 710-2, and perform convolution the synthesized image with the second PSF pattern 720-2 corresponding to the first depth value, and in the same manner, the processor 140 may obtain a synthesized image composed of pixels having the n-th depth value by synthesizing the RGB-D image 700 with the n-th depth map mask 710-*n*, and perform convolution the synthesized image with the n-th PSF pattern 720-*n* corresponding to the n-th depth value. The processor 140 may obtain the convolution image 730** by summing images obtained via convolution operations.

The convolution image 730 is a simulated image in which per-pixel image values are focus distorted according to depth values by performing convolution of the pixels included in the image with the plurality of PSF patterns 720-1 to **720-*n* corresponding to the depth values. In an embodiment of the present disclosure, the processor 140 may obtain a plurality of convolution images 730 by using a plurality of RGB-D images 700, a plurality of depth map masks 710-1 to 710-*n* respectively corresponding to the plurality of RGB-D images 700, and a plurality of PSF patterns 720-1 to 720-*n* corresponding to different depth values. The plurality of RGB-D images 700** may be images previously obtained to generate training data.

In operation S720, the electronic device 100 trains the AI model 156 by using the training data. The processor 140 of the electronic device 100 may train the AI model 156, via a supervised learning technique, by applying the plurality of convolution images 730 as input data and a plurality of depth maps 740 respectively corresponding to the plurality of convolution images 730 as output ground truth. The plurality of depth maps 740 may be images previously obtained based on per-pixel depth value data of the RGB-D images 700. In an embodiment of the present disclosure, the AI model 156 may be a DNN model. 'Training' may refer to training a neural network to discover or learn on its own a method of analyzing pieces of input data to the neural network, a method of classifying the pieces of input data, and/or a method of extracting features necessary for generating resultant data from the pieces of input data. In detail, through the training process, the DNN model may optimize weight values inside the neural network by being trained using the training data (e.g., the plurality of convolution images and the plurality of depth maps).

In an embodiment of the present disclosure, the AI model 156 may be implemented as a U-Net. The U-Net is a type of DNN model used for pixel-level prediction and may have an encoder-decoder architecture. An encoder in the U-Net consists of the repeated application of two 3×3 convolutions which may be followed by a rectified linear unit (ReLU) and batch normalization. The encoder performs downsampling on an image, and in the downsampling operation, a resolution of the image is reduced by ½ via a 2×2 max pooling operation with width of 2 and number of channels of 2. A decoder in the U-Net consists of upsampling of a feature map, a 2×2 convolution that halves the number of channels, and two 3×3 convolutions, followed by a ReLU and batch normalization. The U-Net may concatenate the encoder with the decoder, and is trained by using a 1×1 convolution at the final layer with a sigmoid to map each pixel to a given depth value.

Through the above-described method, the AI model 156 (e.g., the U-Net) may be trained to extract the depth map 740 from the convolution image 730.

In the embodiment illustrated in FIG. 7, the AI model 156 has been described as being implemented as a U-Net, but the present disclosure is not limited thereto. In another embodiment of the disclosure, the AI model 156 may be implemented as one of a CNN, an RNN, an RBM, a DBN, a BRDNN, and a DQN. Furthermore, the AI model 156 may be implemented as any known DNN model.

In the embodiment of FIG. 7, the AI model 156 has been shown and described as being trained by the processor 140 of the electronic device 100, but the present disclosure is not limited thereto. In another embodiment of the present disclosure, the AI model 156 may be trained by another device (e.g., a third device other than the electronic device 100) or a server. In this case, the electronic device 100 may further include a communication interface capable of performing data communication with the other device or the external server, and receive the AI model 156 or resultant data (e.g., a depth map) from inference by the AI model 156 from the other device or external server via the communication interface.

Figure 8:
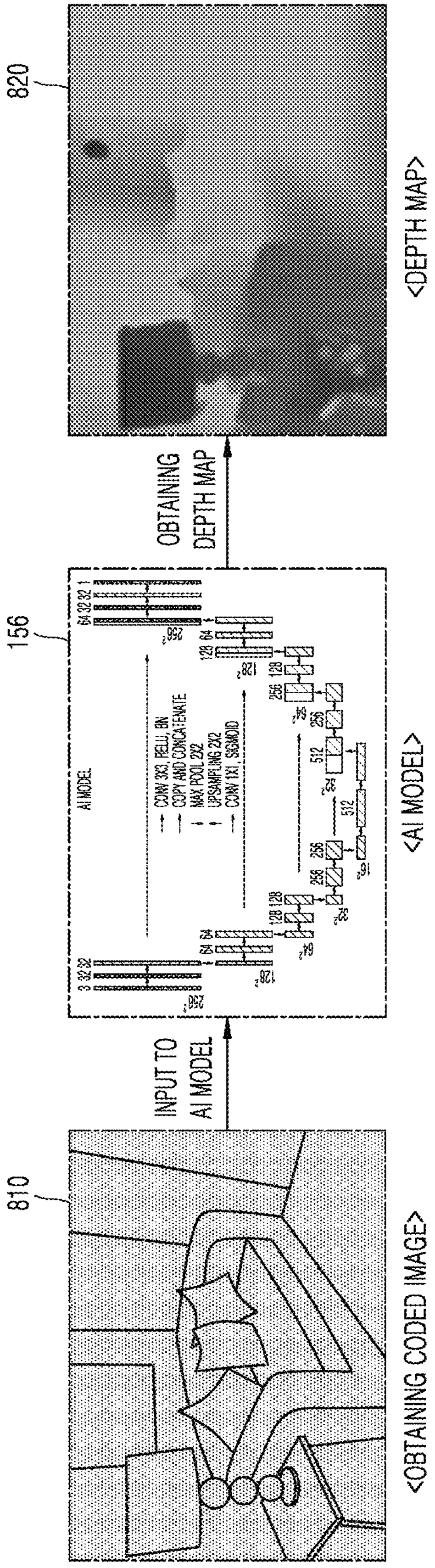
FIG. 8 is a diagram illustrating a process in which an electronic device obtains a depth map from a coded image by using an AI model, according to an embodiment of the present disclosure.

FIG. 8 is a conceptual diagram illustrating a process in which the electronic device 100 obtains a depth map 820 from a coded image 810 by using the AI model 156, according to an embodiment of the present disclosure.

Referring to FIG. 8, the electronic device 100 may input the coded image 810 as input data to the AI model 156 and obtain a depth map 820 corresponding to the coded image 810.

In an embodiment of the present disclosure, the electronic device 100 may obtain the coded image 810 with focus distortion by receiving, via the image sensor (e.g., 130 of FIGS. 1 and 2), light modulated by a phase delay by passing through the phase mask (e.g., 122 of FIGS. 1 and 2) of the active mask panel (e.g., 120 of FIGS. 1 and 2). Each of a plurality of pixels included in the coded image 810 may have a focus distorted image value according to a PSF pattern corresponding to a depth value of an object.

The AI model 156 may be a DNN model trained, though the method described with reference to FIG. 7, by applying the plurality of previously obtained convolution images (e.g., 730 of FIG. 7) as input data, and applying the plurality of depth maps (e.g., of FIG. 7) respectively corresponding to the plurality of convolution images 730, as output ground truth. The processor (e.g., 140 of FIG. 2) of the electronic device 100 may obtain the depth map 820 corresponding to the coded image 810 by inputting the coded image 810 as input data to the trained AI model 156 and performing inference using the AI model 156

Figure 9:
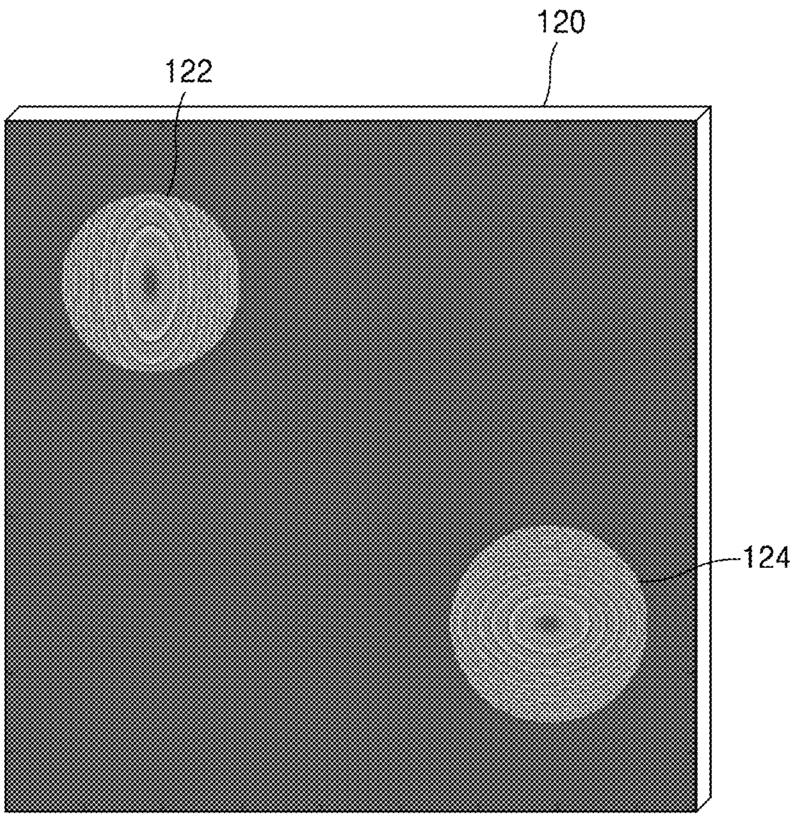
FIG. 9 is a diagram illustrating a phase mask of an active mask panel according to an embodiment of the present disclosure.

FIG. 9 illustrates phase masks 122 and 124 of the active mask panel 120, according to an embodiment of the present disclosure.

Referring to FIG. 9, the electronic device 100 may generate a plurality of phase masks 122 and 124 locally in partial areas of the entire region of the active mask panel 120. The processor (e.g., 140 of FIG. 2) of the electronic device 100 may generate the plurality of phase masks 122 and 124 by applying a control voltage waveform having a phase modulation profile to the active mask panel 120 by using a space division method or a time division method. The space division method involves dividing the active mask panel 120 into a plurality of regions and applying a voltage waveform to the excitation electrodes (e.g., 120*e* of FIG. 6B) corresponding to the plurality of regions. The time division method includes obtaining aperture pattern at the first time point $t_1$ and the second time point $t_2$, respectively, by applying a voltage waveform to first array excitation electrodes arranged along a first direction (e.g., the X-axis direction) at a first time point $t_1$ and by applying a voltage waveform to second array excitation electrodes arranged along a second direction (e.g., the Y-axis direction) at a second time point $t_2$, and forming a final coded aperture pattern by summing the aperture patterns.

The first phase mask 122 may be formed to have a first coded aperture pattern. The first coded aperture pattern may be a first pattern having a plurality of apertures for obtaining a coded image having a first PSF pattern corresponding to a first depth value. The second phase mask 124 may be formed to have a second coded aperture pattern. The second coded aperture pattern may be a second pattern having a plurality of apertures for obtaining a coded image having a second PSF pattern corresponding to a second depth value different from the first depth value. Here, a pattern for obtaining a coded image having a PSF pattern corresponding to a specific depth value (e.g., the first depth value or the second depth value) refers to a coded aperture pattern optimized to maximize focus distortion caused by the PSF corresponding to the specific depth value and thus obtain a highly reliable coded image.

The positions of the first phase mask 122 and the second phase mask 124 may be changed based on a position of at least one excitation electrode to which a control voltage waveform is applied by the processor 140 from among a plurality of excitation electrodes respectively included in the first array excitation electrodes and the second array excitation electrodes.

In FIG. 9, the plurality of phase masks 122 and 124 are shown as two phase masks including the first phase mask 122 and the second phase mask 124, but the present disclosure is not limited thereto. In an embodiment of the present disclosure, the plurality of phase masks 122 and 124 may include three or more phase masks having a plurality of different coded aperture patterns.

Figure 10A:
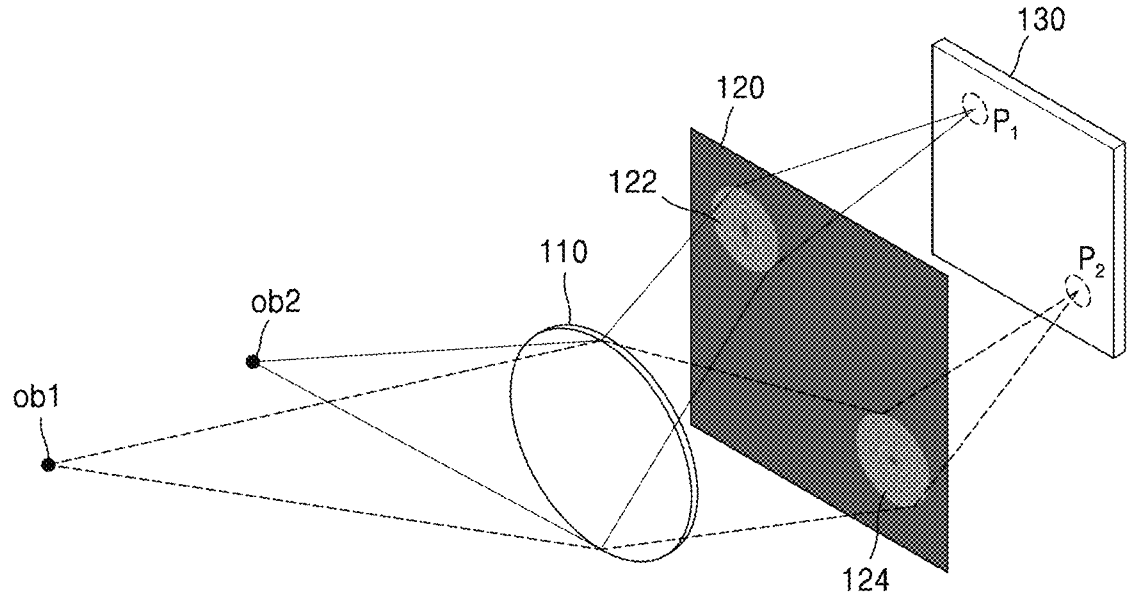
FIG. 10A is a diagram illustrating a process in which an electronic device receives light transmitted through an active mask panel by using an image sensor, according to an embodiment of the present disclosure.

FIG. 10A is a conceptual diagram illustrating a process in which the electronic device 100 receives light transmitted through the active mask panel 120 by using the image sensor 130, according to an embodiment of the present disclosure.

Figure 10B:
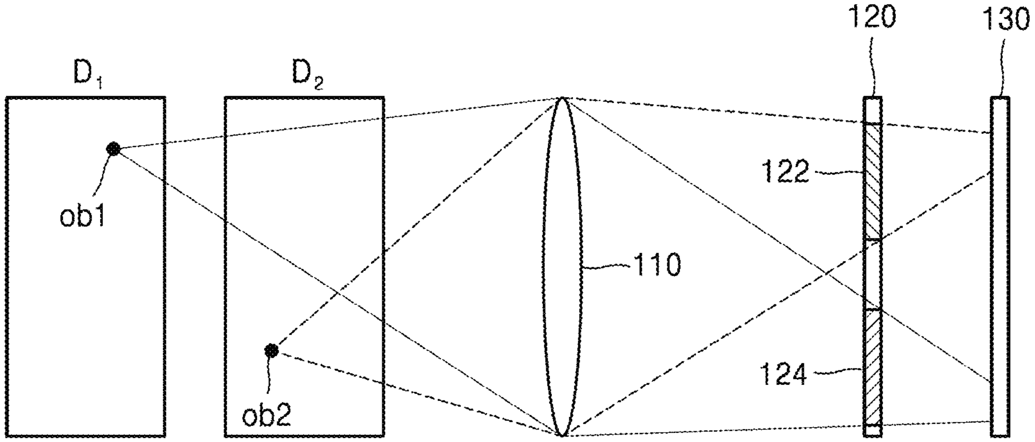
FIG. 10B is a cross-sectional view illustrating a process in which an electronic device receives light transmitted through an active mask panel by using an image sensor, according to an embodiment of the present disclosure.

FIG. 10B is a cross-sectional view illustrating a process in which the electronic device 100 receives light transmitted through the active mask panel 120 by using the image sensor 130, according to an embodiment of the present disclosure.

Referring to FIG. 10A, light related to objects ob1 and ob2 reaches the active mask panel 120 through the lens assembly 110. Referring to FIG. 10B together, the first object ob1 may be placed at a location having a first depth value $D_1$ and the second object ob2 may be placed at a location having a second depth value $D_2$. Light reflected by the first object ob1 may be refracted or diffracted by the lens assembly 110 to reach a second phase mask 124 of the active mask panel 120, refracted when passing through an aperture in a coded aperture pattern of the second phase mask 124, and phase-modulated according to a phase delay. Light related to the first object ob1 may be received by a second pixel $P_2$ of the image sensor 130. Light reflected by the second object ob2 may be refracted or diffracted by the lens assembly 110 to reach a first phase mask 122 of the active mask panel 120, refracted when passing through an aperture in a coded aperture pattern of the first phase mask 122, and phase-modulated. The light related to the second object ob2 may be received by a first pixel $P_1$ of the image sensor 130.

In the embodiment illustrated in FIGS. 10A and 10B, by applying the different phase masks 122 and 124 on the active mask panel 120 according to an optical path based on depth values of the objects ob1 and ob2, the electronic device 100 may obtain a focus distorted coded image so as to obtain a more accurate depth map.

Figure 11:
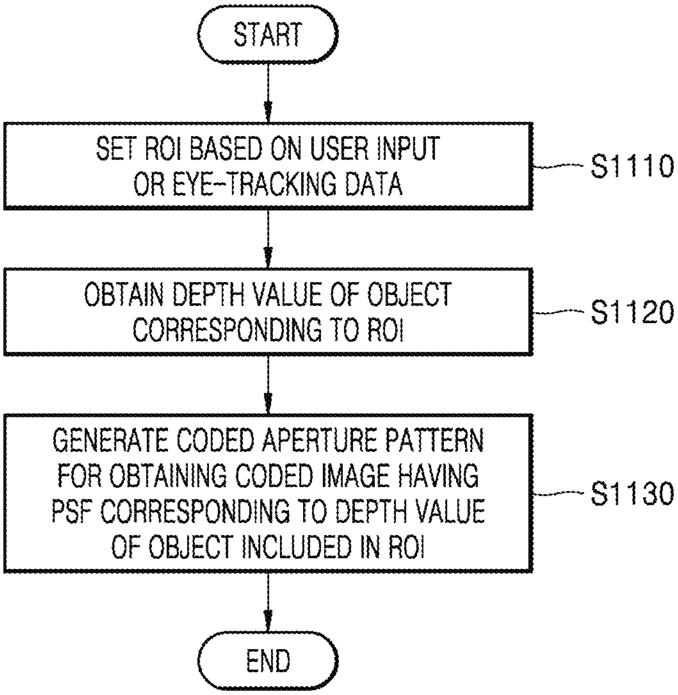
FIG. 11 is a flowchart of a process for generating a coded aperture pattern for obtaining a depth value corresponding to a region of interest, according to an embodiment of the present disclosure.

FIG. 11 is a flowchart of a method, operated by the electronic device 100, of generating a coded aperture pattern for obtaining a depth value corresponding to an ROI, according to an embodiment of the present disclosure.

In an embodiment of the present disclosure, operation S1110 may be performed after operation S330 shown in FIG. 3 is performed.

In operation S1110, the electronic device 100 sets an ROI based on a user input or eye-tracking data. In an embodiment of the present disclosure, the electronic device 100 may include a user input unit for receiving a user input for selecting an ROI including a specific object among real-world objects. For example, the user input unit may be configured as a touch screen that displays a preview image of an object and receives a touch input on a specific area in the preview image. However, the user input unit is not limited thereto, and in another embodiment, the user input unit may include a voice input interface (e.g., a microphone) that receives utterances from the user. The processor 140 of the electronic device (e.g., 100 of FIG. 2) may receive a user input via the user input unit, and set an ROI based on the user input.

In an embodiment of the present disclosure, the electronic device 100 may be implemented as an augmented reality device and include an eye-tracking sensor that tracks a direction of a user's gaze. By tracking gaze directions of two eyes of the user, the processor 140 of the electronic device 100 may detect a gaze point at which the gaze directions of the two eyes of the user converge. The processor 140 may set an ROI based on a position of the detected gaze point.

In operation S1120, the electronic device 100 obtains a depth value of an object corresponding to the ROI. In an embodiment of the present disclosure, the electronic device 100 may further include a low resolution LiDAR sensor. The processor (e.g., 140 of FIG. 2) of the electronic device 100 may obtain a depth value of an object included in the ROI by using the low resolution LiDAR sensor.

In operation S1130, the electronic device 100 generates a coded aperture pattern for obtaining a coded image having a PSF pattern corresponding to the depth value of the object included in the ROI. In an embodiment of the present disclosure, the processor 140 of the electronic device 100 may obtain position information of at least one pixel on the image sensor (e.g., 130 of FIGS. 1 and 2) where light reflected by the object included in the ROI is received, and generate a coded aperture pattern in a partial area of the active mask panel 120 by applying a control voltage waveform to an area corresponding to the position information of the at least one pixel in the entire region of the active mask panel (e.g., 120 of FIGS. 1 and 2). The generated coded aperture pattern may include a plurality of apertures for obtaining a coded image with focus distortion according to a PSF pattern corresponding to the depth value of the object included in the ROI.

When the ROI is set to a plurality of regions, the processor 140 may generate a plurality of coded aperture patterns having different shapes and sizes in partial regions of the entire region of the active mask panel 120. A specific embodiment in which the processor 140 generates a plurality of coded aperture patterns on the active mask panel 120 is described in detail with reference to FIG. 12.

Figure 12:
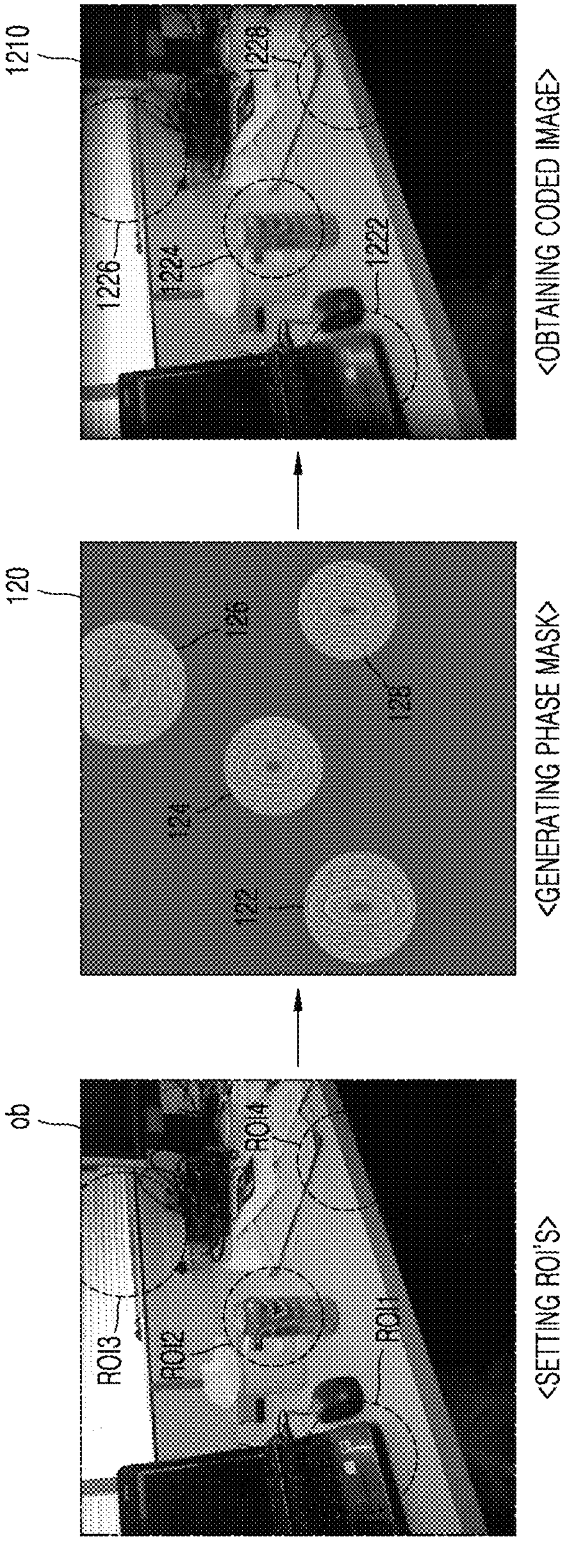
FIG. 12 is a diagram illustrating a process for generating phase masks for obtaining depth values corresponding to regions of interest and obtaining a coded image by using the generated phase masks.

FIG. 12 is a diagram illustrating a process in which the electronic device 100 generates phase masks 122, 124, 126, and 128 for obtaining depth values corresponding to ROIs ROI1 to ROI4 and obtains a coded image 1210 by using the generated phase masks 122, 124, 126, and 128.

Referring to FIG. 12, the electronic device 100 may set the at least one ROI ROI1 to ROI4 for objects ob to be imaged. In an embodiment of the present disclosure, the electronic device 100 may set the at least one ROI ROI1 to ROI4 based on a user input received via a user input unit, or set the at least one ROI ROI1 to ROI4 based on user's eye-tracking data obtained by an eye tracking sensor. In the embodiment illustrated in FIG. 12, the electronic device 100 may set four ROIs, including the first ROI ROI1 to the fourth ROI ROI4. However, it is not limited to that illustrated in FIG. 12, in an embodiment of the present disclosure, the electronic device 100 may set one or two or more ROIs.

The electronic device 100 may generate the phase masks 122, 124, 126, and 128 having coded aperture patterns on regions corresponding to the at least one ROI ROI1 to ROI4 in the entire region of the active mask panel 120. The processor (e.g., 140 of FIG. 2) of the electronic device 100 may determine ranges of the at least one ROI ROI1 to ROI4 based on an arrangement relationship between objects within the at least one ROI ROI1 to ROI4, boundaries and textures of the objects detected via the image sensor (e.g., 130 of FIGS. 1 and 2). The processor 140 may generate the phase masks 122, 124, 126, and 128 in regions corresponding to the determined ranges of the at least one ROI ROI1 to ROI4 in the entire region of the active mask panel 120. In the embodiment illustrated in FIG. 12, the processor 140 may generate the plurality of phase masks 122, 124, 126, and 128 in partial regions of the active mask panel 120, and the plurality of phase masks 122, 124, 126, and 128 may have different coded aperture patterns according to depth values of objects respectively included in the corresponding plurality of ROIs ROI1 to ROI4. Because a specific method by which the processor 140 generates the phase masks 122, 124, 126, and 128 having different coded aperture patterns based on the depth values of the objects is the same as the method described with reference to FIG. 11, redundant descriptions are omitted herein.

The electronic device 100 may obtain the coded image 1210 by capturing images of the objects ob by using the active mask panel 120 on which the phase masks 122, 124, 126, and 128 are formed. The obtained coded image 1210 may be an image in which areas 1222, 1224, 1226, and 1228 corresponding to the ROIs are focus distorted according to different PSFs.

FIG. 13 is a diagram illustrating a process in which the electronic device 100 obtains a coded image 1310 by using phase masks 122 and 124 and obtains a depth map 1320 from the obtained coded image 1310.

Referring to FIG. 13, the electronic device 100 may set two ROIs ROI1 and ROI2 for objects ob1 and ob2. In an embodiment of the present disclosure, the electronic device 100 may generate the first phase mask 122 based on a PSF corresponding to a depth value of the first object ob1 with respect to the entire region of the active mask panel 120, and obtain an initial coded image by receiving light transmitted through the first phase mask 122. After obtaining the initial coded image, the electronic device 100 may set the second ROI ROI2 for the second object ob2 having a depth value different from the depth value of the first object ob1. Because a specific method of setting the ROIs ROI1 and ROI2 is the same as the method described with reference to FIGS. 11 and 12, redundant descriptions are omitted herein.

The electronic device 100 may generate a second phase mask 124 in a partial area of the entire region of the active mask panel 120 corresponding to the second ROI ROI2. The second phase mask 124 may include a coded aperture pattern for obtaining a coded image having a PSF corresponding to a depth value of the object included in the second ROI ROI2. The coded aperture pattern of the second phase mask 124 may include a plurality of apertures having different shapes and sizes than in the coded aperture pattern of the first phase mask 122.

The electronic device 100 may obtain the final coded image 1310 by receiving light transmitted through the first phase mask 122 and the second phase mask 124 of the active mask panel 120 and converting the received light into electrical signals. The final coded image 1310 may be an image in which image values of pixels corresponding to the first ROI ROI1 and the second ROI ROI2 are focus distorted according to different PSFs.

The electronic device 100 obtain the depth map 1320 corresponding to the final coded image 1310 by inputting the final coded image 1310 as input data to the AI model 156 and performing inference using the AI model 156.

The electronic device 100 according to the embodiment illustrated in FIG. 13 may obtain an initial coded image by using a phase mask (e.g., the first phase mask 122) having a universal coded aperture pattern corresponding to a depth value of an object included in an initially set ROI (e.g., the first ROI ROI1), and subsequently set an additional ROI (e.g., the second ROI ROI2), for an object having a different depth value based on a user input or eye-tracking data, generate a phase mask (e.g., the second phase mask 124) having a coded aperture pattern optimized for the set additional ROI, and obtain the final encoded image 1310 by using the plurality of phase masks 122 and 124, thereby obtaining the depth map 1320 with high accuracy based on the depth values. Furthermore, according to an embodiment of the present disclosure, the electronic device 100 may set ROIs ROI1 and ROI2 by using a user input or eye-tracking data, thereby enhancing interaction with the user and obtaining accurate depth values for the set ROIs according to the user's intent.

According to an aspect of the present disclosure, an electronic device 100 for obtaining a depth map from a coded image is provided. According to an embodiment of the present disclosure, the electronic device 100 may include a lens assembly 110 including at least one lens, an active mask panel 120 configured to change refractive power of light transmitted through the active mask panel 120 according to an electrical driving signal, an image sensor 130 configured to receive the light transmitted through the lens assembly 110 and the active mask panel 120, and at least one processor 140. The at least one processor 140 may be configured to generate a first phase mask having a first coded aperture pattern on the active mask panel 120 by controlling the electrical driving signal applied to the active mask panel 120. The at least one processor 140 may be configured to obtain a coded image, which is phase-modulated, by receiving, via the image sensor 130, light transmitted through the first phase mask. The at least one processor 140 may be configured to obtain a depth map corresponding to the coded image by using an AI model trained to extract a depth map from a convolution image.

In an embodiment of the present disclosure, the active mask panel 120 may be an electrically tunable liquid crystal panel that, by changing an arrangement angle of liquid crystal molecules disposed in a region corresponding to a coded aperture according to an applied voltage value, locally adjusts refractive power of light transmitted through the liquid crystal molecules and modulates phase of the light.

In an embodiment of the present disclosure, the active mask panel 120 may be disposed between the lens assembly 110 and the image sensor 130 of a camera.

In an embodiment of the present disclosure, the AI model may be a DNN model trained, via supervised learning, by applying a plurality of previously obtained convolution images as input data and applying a plurality of depth maps as output ground truth. The plurality of convolution images may be images obtained by performing convolution of a plurality of RGB-D images with PSF patterns corresponding to pixel-wise depth values of the plurality of RGB-D images.

In an embodiment of the present disclosure, the first phase mask may be formed locally in a partial area of an entire region of the active mask panel 120, and a position of the first phase mask may be changed according to the electrical driving signal.

In an embodiment of the present disclosure, the at least one processor 140 may be configured to generate a second phase mask having a second coded aperture pattern in a partial area of the active mask panel 120.

In an embodiment of the present disclosure, the first coded aperture pattern may be a pattern having a plurality of apertures for obtaining a first coded image having a first PSF corresponding to a first depth value. The second coded aperture pattern may be a pattern having a plurality of apertures for obtaining a second coded image having a second PSF corresponding to a second depth value.

In an embodiment of the present disclosure, the electronic device 100 may further include an eye-tracking sensor configured to obtain gaze information by tracking gaze directions of two eyes of a user. The at least one processor 140 may set an ROI based on eye-tracking data obtained by the eye-tracking sensor. The at least one processor 140 may be configured to obtain a depth value of an object included in the set ROI by using a low resolution LiDAR sensor, and generate the second coded aperture pattern for obtaining a second coded image having a PSF corresponding to the obtained depth value.

In an embodiment of the present disclosure, the at least one processor 140 may be configured to generate the second coded aperture pattern in an area corresponding to the ROI in the entire region of the active mask panel 120.

In an embodiment of the present disclosure, the at least one processor 140 may be configured to obtain a final coded image by receiving, via the image sensor 130, light transmitted through the active mask panel 120 including the first phase mask and the second phase mask. The at least one processor 140 may be configured to input the final coded image to the AI model and obtain a depth map for the final coded image via inference using the AI model.

According to another aspect of the present disclosure, a method, operated by the electronic device 100, of obtaining a depth map from a coded image is provided. In an embodiment of the present disclosure, the method may include generating a first phase mask having a first coded aperture pattern by applying an electrical driving signal to the active mask panel 120 (S310). The method may include obtaining a coded image, which is phase-modulated, by receiving, via the image sensor 130, light transmitted through the first phase mask (S320). The method may include obtaining a depth map corresponding to the coded image by using an AI model trained to extract a depth map from a convolution image (S330).

In an embodiment of the present disclosure, the active mask panel 120 may be an electrically tunable liquid crystal panel that, by changing an arrangement angle of liquid crystal molecules disposed in a region corresponding to a coded aperture according to an applied voltage value, locally adjusts refractive power of light transmitted through the liquid crystal molecules and modulates phase of the light.

In an embodiment of the present disclosure, the method may further include generating training data by obtaining a plurality of convolution images by performing convolution of a plurality of RGB-D images with PSF patterns corresponding to pixel-wise depth values of the plurality of RGB-D images (S710), and training the AI model, via supervised learning, by applying the obtained plurality of convolution images as input data and applying a plurality of depth maps respectively corresponding to the plurality of RGB-D images as output ground truth (S720).

In an embodiment of the present disclosure, the first phase mask may be formed locally in a partial area of an entire region of the active mask panel 120, and a position of the first phase mask may be changed according to the electrical driving signal.

In an embodiment of the present disclosure, the method may further include generating a second phase mask having a second coded aperture pattern in a partial area of the active mask panel 120.

In an embodiment of the present disclosure, the first coded aperture pattern may be a pattern having a plurality of apertures for obtaining a first coded image having a first PSF corresponding to a first depth value. The second coded aperture pattern may be a pattern having a plurality of apertures for obtaining a second coded image having a second PSF corresponding to a second depth value.

In an embodiment of the present disclosure, the method may further include setting an ROI based on a user input or eye-tracking data of a user (S1110), and obtaining a depth value of an object included in the set ROI (S1120). The generating of the second phase mask may include generating the second coded aperture pattern for obtaining a second coded image having a PSF corresponding to the depth value of the object included in the ROI.

In an embodiment of the present disclosure, the generating of the second phase mask may include generating the second coded aperture pattern in an area corresponding to the ROI in the entire region of the active mask panel 120.

In an embodiment of the present disclosure, the method may further include obtaining a final coded image by receiving, via the image sensor 130, light transmitted through the active mask panel 120 including the first phase mask and the second phase mask. The method may further include inputting the final coded image to the AI model and obtaining a depth map for the final coded image via inference using the AI model.

To solve the technical problems described above, according to another aspect of the present disclosure, there is provided a computer program product including a computer-readable storage medium having recorded thereon a program for execution on a computer. The storage medium may include instructions that are readable by the electronic device 100 to generate a first phase mask having a first coded aperture pattern by applying an electrical driving signal to the active mask panel 120, obtain a coded image, which is phase-modulated, by receiving, via the image sensor 130, light transmitted through the first phase mask, and obtain a depth map corresponding to the coded image by using an AI model trained to extract a depth map from a convolution image.

A program executed by the electronic device 100 described in this specification may be implemented as a hardware component, a software component, and/or a combination of the hardware component and the software component. The program may be executed by any system capable of executing computer-readable instructions.

Software may include a computer program, a piece of code, an instruction, or a combination of one or more thereof, and configure a processing device to operate as desired or instruct the processing device independently or collectively.

The software may be implemented as a computer program including instructions stored in computer-readable storage media. Examples of the computer-readable recording media include magnetic storage media (e.g., ROM, RAM, floppy disks, hard disks, etc.), optical recording media (e.g., compact disc (CD)-ROM and a digital versatile disc (DVD)), etc. The computer-readable recording media may be distributed over computer systems connected through a network so that computer-readable code may be stored and executed in a distributed manner. The media may be readable by a computer, stored in a memory, and executed by a processor.

A computer-readable storage medium may be provided in the form of a non-transitory storage medium. In this regard, the term 'non-transitory' only means that the storage medium does not include a signal and is a tangible device, and the term does not differentiate between where data is semi-permanently stored in the storage medium and where the data is temporarily stored in the storage medium. For example, the 'non-transitory storage medium' may include a buffer in which data is temporarily stored.

Furthermore, programs according to embodiments disclosed in the present specification may be included in a computer program product when provided. The computer program product may be traded, as a product, between a seller and a buyer.

The computer program product may include a software program and a computer-readable storage medium having stored thereon the software program. For example, the computer program product may include a product (e.g., a downloadable application) in the form of a software program electronically distributed by a manufacturer of the electronic device 100 or through an electronic market (e.g., Samsung Galaxy Store™ and Google Play Store™). For such electronic distribution, at least a part of the software program may be stored in the storage medium or may be temporarily generated. In this case, the storage medium may be a storage medium of a server of a manufacturer of a vehicle or the electronic device 100, a server of the electronic market, or a relay server for temporarily storing the software program.

In a system including the electronic device 100 and/or a server, the computer program product may include a storage medium of the server or a storage medium of the electronic device 100. Alternatively, in a case where there is a third device (e.g., a mobile device or wearable device) communicatively connected to the electronic device 100, the computer program product may include a storage medium of the third device. Alternatively, the computer program product may include a software program itself that is transmitted from the electronic device 100 to an electronic device or the third device or that is transmitted from the third device to the electronic device.

In this case, at least one of the electronic device 100 and the third device may execute the computer program product to perform methods according to the disclosed embodiments. Alternatively, one of the electronic device 100 and the third device may execute the computer program product to perform the methods according to the disclosed embodiments in a distributed manner.

For example, the electronic device 100 may execute the computer program product stored in the memory (e.g., 150 of FIG. 2) to control another electronic device (e.g., a mobile device or wearable device) communicatively connected to the electronic device 100 to perform the methods according to the disclosed embodiments.

In another example, the third device may execute the computer program product to control an electronic device communicatively connected to the third device to perform the methods according to the disclosed embodiments.

In a case where the third device executes the computer program product, the third device may download the computer program product from the electronic device 100 and execute the downloaded computer program product. Alternatively, the third device may execute the computer program product that is pre-loaded therein to perform the methods according to the disclosed embodiments.

While the embodiments have been described above with reference to limited examples and figures, it will be understood by those of ordinary skill in the art that various modifications and changes in form and details may be made from the above descriptions. For example, adequate effects may be achieved even when the above-described techniques are performed in a different order than that described above, and/or the aforementioned components such as computer systems or modules are coupled or combined in different forms and modes than those described above or are replaced or supplemented by other components or their equivalents.

What is claimed is:

1. An electronic device comprising:

a lens assembly including at least one lens;

an active mask panel configured to change refractive power of light transmitted through the active mask panel based on an electrical driving signal;

an image sensor configured to receive light transmitted through the lens assembly and the active mask panel;

at least one processor including processing circuitry; and memory storing one or more instructions that, when executed by the at least one processor individually or collectively, cause the electronic device to:

generate a first phase mask having a first coded aperture pattern in a first area on the active mask panel based on controlling the electrical driving signal applied to the active mask panel, obtain a coded image based on light transmitted through the first phase mask, wherein the coded image is phase-modulated, and wherein the light transmitted through the first phase mask is received via the image sensor, and obtain a depth map corresponding to the coded image by using an artificial intelligence model trained to extract a depth map from a convolution image.

2. The electronic device of claim 1, wherein the active mask panel is an electrically tunable liquid crystal panel configured to locally adjust refractive power of light transmitted through liquid crystal molecules and modulate a phase of the light transmitted through the liquid crystal molecules based on changing an arrangement angle of the liquid crystal molecules disposed in a region corresponding to a coded aperture according to an applied voltage value.

3. The electronic device of claim 1, wherein the artificial intelligence model is a deep neural network model trained, via supervised learning, by applying a plurality of convolution images, that are previously obtained, as input data and applying a plurality of depth maps as output ground truth, and the plurality of convolution images are images obtained by performing convolution of a plurality of red, green, blue, and depth (RGB-D) images with point spread function (PSF) patterns corresponding to pixel-wise depth values of the plurality of RGB-D images.

4. The electronic device of claim 1, wherein the first area is formed in a first partial area of an entire region of the active mask panel, and wherein a position of the first phase mask is changed according to the electrical driving signal.

5. The electronic device of claim 1, wherein the one or more instructions are further configured to, when executed by the at least one processor individually or collectively, cause the electronic device to:

generate a second phase mask having a second coded aperture pattern in a second partial area of the active mask panel.

6. The electronic device of claim 5, wherein the first coded aperture pattern is a first pattern having a first plurality of apertures for obtaining a first coded image having a first PSF corresponding to a first depth value, and the second coded aperture pattern is a second pattern having a second plurality of apertures for obtaining a second coded image having a second PSF corresponding to a second depth value.

7. The electronic device of claim 5, further comprising:

an eye-tracking sensor configured to obtain gaze information by tracking gaze directions of a user, wherein the one or more instructions are further configured to, when executed by the at least one processor individually or collectively, cause the electronic device to:

set a region of interest (ROI) based on eye-tracking data obtained by the eye-tracking sensor, obtain a depth value of an object included in the set ROI by using a low resolution light detection and ranging (LiDAR) sensor, and generate the second coded aperture pattern for obtaining a second coded image having a PSF corresponding to the depth value.

8. A method for obtaining depth map, the method being performed by at least one processor of an electronic device, the method comprising:

generating a first phase mask having a first coded aperture pattern in a first area based on an electrical driving signal applied to an active mask panel;

obtaining a coded image based on light transmitted through the first phase mask, wherein the coded image is phase-modulated; and obtaining a depth map corresponding to the coded image by using an artificial intelligence model trained to extract a depth map from a convolution image.

9. The method of claim 8, wherein the active mask panel is an electrically tunable liquid crystal panel configured to locally adjust refractive power of light transmitted through liquid crystal molecules and modulate a phase of the light transmitted through the liquid crystal molecules based on changing an arrangement angle of the liquid crystal molecules disposed in a region corresponding to a coded aperture according to an applied voltage value.

10. The method of claim 8, further comprising:

generating training data by obtaining a plurality of convolution images by performing convolution of a plurality of red, green, blue, and depth (RGB-D) images with point spread function (PSF) patterns corresponding to pixel-wise depth values of the plurality of RGB-D images; and training the artificial intelligence model, via supervised learning, by applying the plurality of convolution images as input data and applying a plurality of depth maps respectively corresponding to the plurality of RGB-D images as output ground truth.

11. The method of claim 8, wherein the first phase mask is formed in a first partial area of an entire region of the active mask panel, and wherein a position of the first phase mask is changed according to the electrical driving signal.

12. The method of claim 8, further comprising:

generating a second phase mask having a second coded aperture pattern in a partial area of the active mask panel.

13. The method of claim 12, wherein:

the first coded aperture pattern is a first pattern having a first plurality of apertures for obtaining a first coded image having a first PSF corresponding to a first depth value, and the second coded aperture pattern is a second pattern having a second plurality of apertures for obtaining a second coded image having a second PSF corresponding to a second depth value.

14. The method of claim 12, further comprising:

setting a region of interest (ROI) based on a user input or eye-tracking data of a user; and obtaining a depth value of an object included in the set ROI, wherein the generating of the second phase mask comprises:

generating the second coded aperture pattern for obtaining a second coded image having a PSF corresponding to the depth value of the object included in the ROI.

15. A non-transitory computer readable medium comprising one or more instructions that, when executed, cause at least one processor to:

generate a first phase mask having a first coded aperture pattern in a first area based on an electrical driving signal applied to an active mask panel;

obtain a coded image light transmitted through the first phase mask, wherein the coded image is phase-modulated; and obtain a depth map corresponding to the coded image by using an artificial intelligence model trained to extract a depth map from a convolution image.

16. The non-transitory computer readable medium of claim 15, wherein the active mask panel is an electrically tunable liquid crystal panel configured to locally adjust refractive power of light transmitted through liquid crystal molecules and modulate a phase of the light transmitted through the liquid crystal molecules based on changing an arrangement angle of the liquid crystal molecules disposed in a region corresponding to a coded aperture according to an applied voltage value.

17. The non-transitory computer readable medium of claim 15, wherein the first phase mask is formed in a first partial area of an entire region of the active mask panel, and wherein a position of the first phase mask is changed according to the electrical driving signal.

18. The non-transitory computer readable medium of claim 15, wherein the one or more instructions further cause the at least one processor to:

generate a second phase mask having a second coded aperture pattern in a partial area of the active mask panel.

19. The non-transitory computer readable medium of claim 18, wherein:

the first coded aperture pattern is a first pattern having a first plurality of apertures for obtaining a first coded image having a first PSF corresponding to a first depth value, and the second coded aperture pattern is a second pattern having a second plurality of apertures for obtaining a second coded image having a second PSF corresponding to a second depth value.

20. The non-transitory computer readable medium of claim 18, wherein the one or more instructions further cause the at least one processor to:

set a region of interest (ROI) based on a user input or eye-tracking data of a user; and obtain a depth value of an object included in the set ROI, and generate the second coded aperture pattern for obtaining a second coded image having a PSF corresponding to the depth value of the object included in the ROI.

* * * * *